(12) United States Patent
Campbell

(10) Patent No.: US 9,376,049 B2
(45) Date of Patent: Jun. 28, 2016

(54) METHOD OF FABRICATING TYPE 4 CYLINDERS AND ARRANGING IN TRANSPORTATION HOUSINGS FOR TRANSPORT OF GASEOUS FLUIDS

(75) Inventor: Steve Campbell, St.-John's (CA)

(73) Assignee: TRANZGAZ INC., St. John's Newfoundland (CA)

( * ) Notice: Subject to any disclaimer, the term of this patent is extended or adjusted under 35 U.S.C. 154(b) by 0 days.

(21) Appl. No.: 14/239,938

(22) PCT Filed: Aug. 22, 2012

(86) PCT No.: PCT/CA2012/000778
§ 371 (c)(1),
(2), (4) Date: Mar. 7, 2014

(87) PCT Pub. No.: WO2013/026140
PCT Pub. Date: Feb. 28, 2013

(65) Prior Publication Data
US 2014/0191499 A1    Jul. 10, 2014

Related U.S. Application Data

(60) Provisional application No. 61/526,020, filed on Aug. 22, 2011, provisional application No. 61/532,452, filed on Sep. 8, 2011.

(51) Int. Cl.
*F17C 1/02* (2006.01)
*B60P 3/22* (2006.01)
(Continued)

(52) U.S. Cl.
CPC ............. *B60P 3/2205* (2013.01); *B65B 3/04* (2013.01); *F17C 1/16* (2013.01); *F17C 3/00* (2013.01); *F17C 13/083* (2013.01); *B63B 17/0027* (2013.01); *B63B 25/004* (2013.01); *B63B 25/14* (2013.01); *B63B 25/16* (2013.01); *B63J 2099/003* (2013.01); *F17C 2201/0109* (2013.01); *F17C 2201/0128* (2013.01); *F17C 2201/0166* (2013.01); *F17C 2201/0171* (2013.01); *F17C 2201/032* (2013.01); *F17C 2201/035* (2013.01); *F17C 2201/054* (2013.01); *F17C 2203/0604* (2013.01); *F17C 2203/066* (2013.01);
(Continued)

(58) Field of Classification Search
CPC ................. F17C 1/16; F17C 2205/013; F17C 2270/0171; F17C 2205/0107; F17C 2205/0305; B60P 3/2215; B60P 3/22; B60P 3/2205; B63B 25/14; Y10T 29/49826; B65D 11/08; B65D 25/005
USPC ............................ 220/601, 901, 4.13, 1.5, 661
See application file for complete search history.

(56) References Cited

U.S. PATENT DOCUMENTS 3,479,043 A * 11/1969 Piehl ............................... 280/830
4,004,709 A * 1/1977 Simkus ......................... 220/257.1
(Continued)

FOREIGN PATENT DOCUMENTS

KR         20110019958         3/2011

*Primary Examiner* — Stephen Castellano
(74) *Attorney, Agent, or Firm* — Greer, Burns & Crain, Ltd.

(57) ABSTRACT

A lightweight intermodal or road trailer based system for transporting refrigerated gaseous fluids is provided. The system includes an enclosed and insulated transportation housing, and a plurality of low-temperature resistant type 4 pressure vessels. The pressure vessels are at least three feet in diameter secured within the transportation housing for containing the gaseous fluids.

15 Claims, 22 Drawing Sheets

(51) Int. Cl.
*F17C 1/16* (2006.01)
*F17C 3/00* (2006.01)
*F17C 13/08* (2006.01)
*B65B 3/04* (2006.01)
*B63B 25/14* (2006.01)
*B63B 17/00* (2006.01)
*B63B 25/00* (2006.01)
*B63B 25/16* (2006.01)
*B63J 99/00* (2009.01)

(52) U.S. Cl.
CPC . *F17C2203/0619* (2013.01); *F17C 2203/0663* (2013.01); *F17C 2205/013* (2013.01); *F17C 2205/0107* (2013.01); *F17C 2205/0111* (2013.01); *F17C 2205/0126* (2013.01); *F17C 2205/0142* (2013.01); *F17C 2205/0176* (2013.01); *F17C 2205/0305* (2013.01); *F17C 2205/0323* (2013.01); *F17C 2205/0332* (2013.01); *F17C 2205/0394* (2013.01); *F17C 2205/0397* (2013.01); *F17C 2209/2118* (2013.01); *F17C 2209/2127* (2013.01); *F17C 2209/2163* (2013.01); *F17C 2209/221* (2013.01); *F17C 2209/232* (2013.01); *F17C 2221/012* (2013.01); *F17C 2221/031* (2013.01); *F17C 2221/033* (2013.01); *F17C 2223/0123* (2013.01); *F17C 2223/0161* (2013.01); *F17C 2223/033* (2013.01); *F17C 2223/035* (2013.01); *F17C 2223/036* (2013.01); *F17C 2223/043* (2013.01); *F17C 2223/047* (2013.01); *F17C 2227/0135* (2013.01); *F17C 2227/039* (2013.01); *F17C 2227/0309* (2013.01); *F17C 2227/0344* (2013.01); *F17C 2250/0439* (2013.01); *F17C 2250/0469* (2013.01); *F17C 2250/0491* (2013.01); *F17C 2260/016* (2013.01); *F17C 2260/036* (2013.01); *F17C 2270/0105* (2013.01); *F17C 2270/0113* (2013.01); *F17C 2270/0171* (2013.01); *F17C 2270/0173* (2013.01); *Y02E 60/321* (2013.01); *Y02T 70/5263* (2013.01)

(56) References Cited

U.S. PATENT DOCUMENTS

| | | | | |
|---|---|---|---|---|
| 4,060,174 | A * | 11/1977 | Gerhard | 220/23.4 |
| 4,619,374 | A * | 10/1986 | Yavorsky | 220/62.19 |
| 5,018,638 | A * | 5/1991 | Auberon et al. | 220/590 |
| 5,383,566 | A * | 1/1995 | Johnson | 220/562 |
| 6,339,996 | B1 | 1/2002 | Campbell | |
| 2002/0053573 | A1* | 5/2002 | Bowen et al. | 220/581 |
| 2003/0167985 | A1* | 9/2003 | Abdullah et al. | 110/334 |
| 2008/0164251 | A1* | 7/2008 | Fawley | 220/1.5 |
| 2010/0018603 | A1 | 1/2010 | Adler | |

* cited by examiner

METHOD OF FABRICATING TYPE 4 CYLINDERS AND ARRANGING IN TRANSPORTATION HOUSINGS FOR TRANSPORT OF GASEOUS FLUIDS

This application is a 371 (national stage filing) of PCT/CA2012/000778 filed Aug. 22, 2012 which claims benefit of provisional Ser. No. 61/526,020 filed Aug. 22, 2011 and of provisional Ser. No. 61/532,452 filed Sep. 8, 2011.

TECHNICAL FIELD

The present invention relates to a method of fabricating low-temperature resistant type 4 pressure vessels and their arrangement into insulated transportation housings for the storage and/or transport of gaseous fluids.

BACKGROUND

There currently exists a problem in transporting gaseous substances such as natural gas and hydrogen by road, rail and sea under refrigerated conditions due to the weight, potential danger of failure, and/or the cost of the pressure vessel systems available. As is known, steel systems are very heavy and are prone to corrosion. They are also limited to near ambient storage temperatures as the potential danger of a brittle/ductile failure exists due to Joule Thompson effects caused by decompression. This is a significant restriction on potential applications as the refrigeration of compressed gases generally increases density thus, increases the net capacity within the same volume of storage space, therein increasing cost efficiency and potential profitability.

Type 2 pressure vessel systems have similar weight and corrosion problems.

Type 3 pressure vessel systems using carbon steel liners also have similar weight and corrosion problems as well as potential ductility problems at lower temperatures.

Type 3 pressure vessel systems made with aluminum liners overcome the weight and the ductility problems to a certain extent at reduced temperatures, however, aluminum is prone to corrosion. Thus, there still exists the danger of a potential failure due to corrosion, especially at the piping interface. In addition, type 3 pressure vessels with aluminum liners can only be cost-efficiently made seamless up to a limited diameter. Thus, for the bulk storage and/or transport of gaseous fluids using such type 3 pressure vessels, a lot of pressure vessels would be required. This would require a large number of connections, each one being a potential source of failure. This decreases the level of safety of this alternative. Further still, the large number of such relatively small type 3 pressure vessels and respective connections required to justify a bulk transportation project may make such a project infeasible. The same potential problem of a large number of connections would exist with relatively small diameter type 4 pressure vessels.

Currently, type 4 cylinders made from extruded high density polyethylene (HDPE) pipe and injection-molded domes with polar port bosses are being marketed in a long horizontal arrangement. However, due to the design of these tanks, they cannot be refrigerated. As noted above, this incurs a disadvantage to capacity and therefore, potential economic feasibility. The problems with the design of the current type 4 pressure vessels made from extruded HDPE pipe and injection molded domes under refrigerated conditions are numerous. Firstly, the toe-in effect of extruded HDPE pipe leaves a circumferential indentation at the pipe end and injection-molded dome edge weld line. This creates a discontinuity in circular diameter at the weld line. Should the pressure vessel be refrigerated, the volumetric shrinking of the liner relative to the laminate shell will create a stress concentration at the weld line. This is an undesirable condition as it could be the source of a liner failure.

The second potential problem with refrigerating this design of pressure vessel is in the design of the port boss liner interface. As the port boss is inset into an injection mold, it uses the cooling and the related contracting effect to seal the HDPE material onto the opposing tabs and slots of the port boss. Thus, once the pressure vessel is completely fabricated, any additional refrigeration would create further contracting of the HDPE material which may pull the material away from the tabs and slots or tear the liner material at this location. Neither of these would be a desirable consequence as the integrity of the liner would then be compromised.

Further still, even if the known type 4 cylinders could be refrigerated, two other problems would exist. The first is the potential of overturning in a road or rail application due to sloshing. When refrigerated under pressure, many gaseous substances such as natural gas become partially liquid or fluid like. A fluid like substance would create an end impact when braking is applied. This impact force could overturn or cause damage to the rather long pressure vessel(s) and/or related support system. The second problem that would be inherent with a horizontal arrangement of refrigerated pressure vessels with polar port bosses is that condensed liquids cannot be removed without vaporizing the liquids. This may be infeasible and/or impractical in refrigerated systems. Thus, even if the currently marketed type 4 pressure vessels could be refrigerated, other problems are perceived to exist due to condensed liquids.

There is an additional problem inherent in the current design of extruded HDPE pipe with injection-molded domes that is unrelated to refrigeration. It deals with the wall thickness of injection-molded parts. Such parts are inherently thin (relatively speaking). This potentially creates a significant deficiency in stability of the liner during the winding process. As the relatively thin-walled plastic domes have to carry the full weight of the liner/mandrel, filament fibers and wet resin, the amount of filament fiber and resin and thus maximum operating pressure of the pressure vessels in this manner is limited. Similarly, so is the type of filament fiber applicable. Notably, fiberglass is heavier than carbon fiber for comparable operating pressures. In summary, this design limits use to only carbon fiber and at limited operating pressures.

Accordingly, there is a need for a novel intermodal container or road trailer system for storing and/or transporting gaseous fluids.

SUMMARY

According to one object of one embodiment of the invention, there is provided a lightweight intermodal container or road trailer system for storing and/or transporting refrigerated gaseous fluids, comprising:
  an enclosed and insulated transportation housing; and
  a plurality of low-temperature resistant type 4 pressure vessels of at least three feet in diameter secured within said transportation housing for containing said gaseous fluids.

According to another object of one embodiment of the invention, there is provided a method of providing a lightweight intermodal container or road trailer system for storing and/or transporting refrigerated gaseous fluids, comprising:

loading conventional liquefied natural gas (LNG) into insulated type 4 pressure vessels housed within a transportation housing for the transport of pressurized, liquefied natural gas.

According to a further object of the invention, there is provided A lightweight intermodal container, comprising:

An insulated type 4 pressure vessels housed within a transportation housing to retain natural gas by a marine vessel.

According to yet another object of the invention, there is provided A lightweight intermodal container or road trailer system, comprising:

at least one low-temperature resistant type 4 pressure vessel installed onto a marine vessel to store natural gas as a fuel for said marine vessel.

INDUSTRIAL APPLICABILITY

The present invention has applicability in the gaseous fluid handling art and suitable containers for transporting fluids.

DETAILED DESCRIPTION

Figure 1:
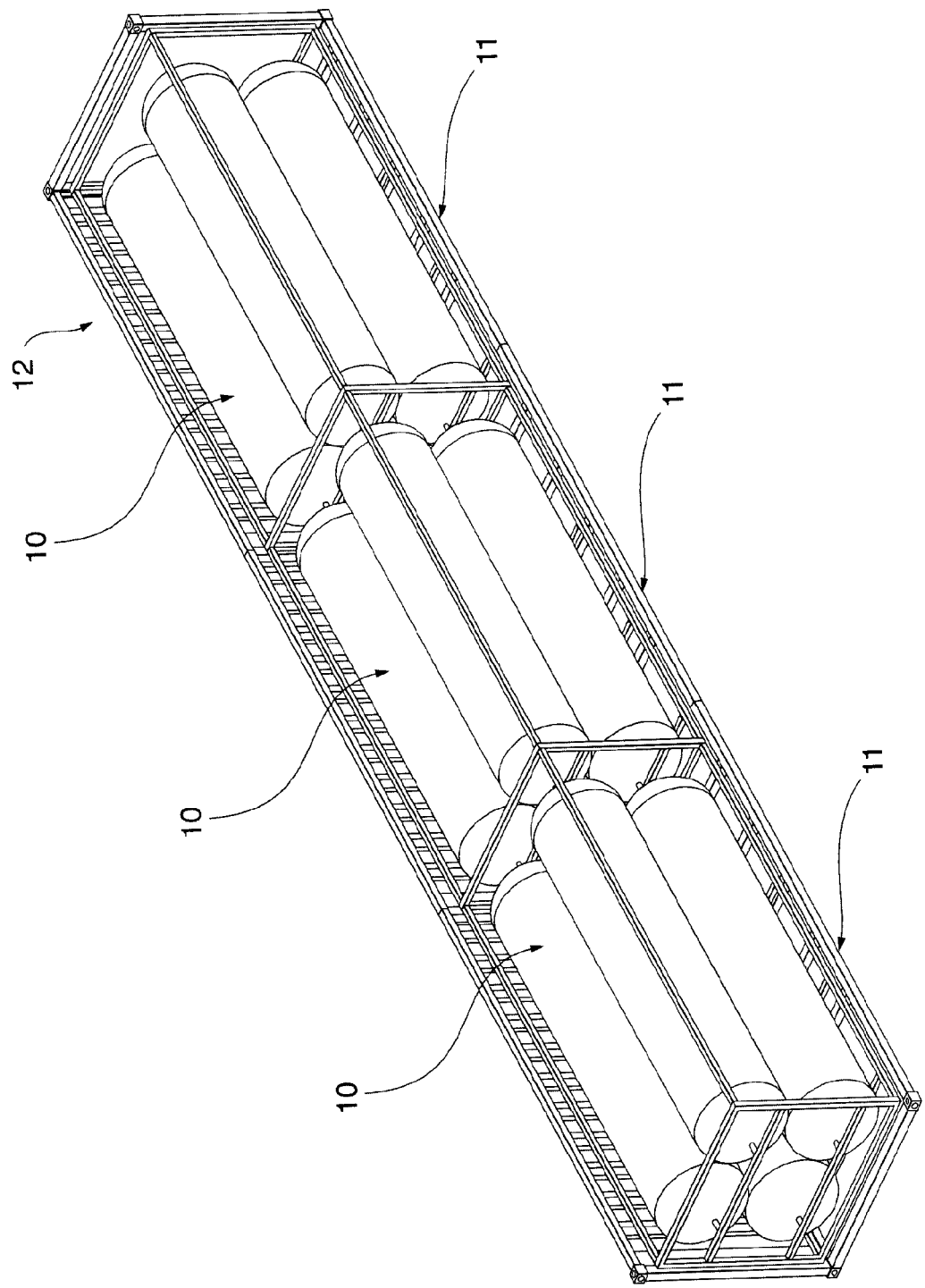
FIG. 1 is a perspective sectional view of a fifty-three foot intermodal container having three type 4 pressure vessel module support frames according to one embodiment.
Figure 2:
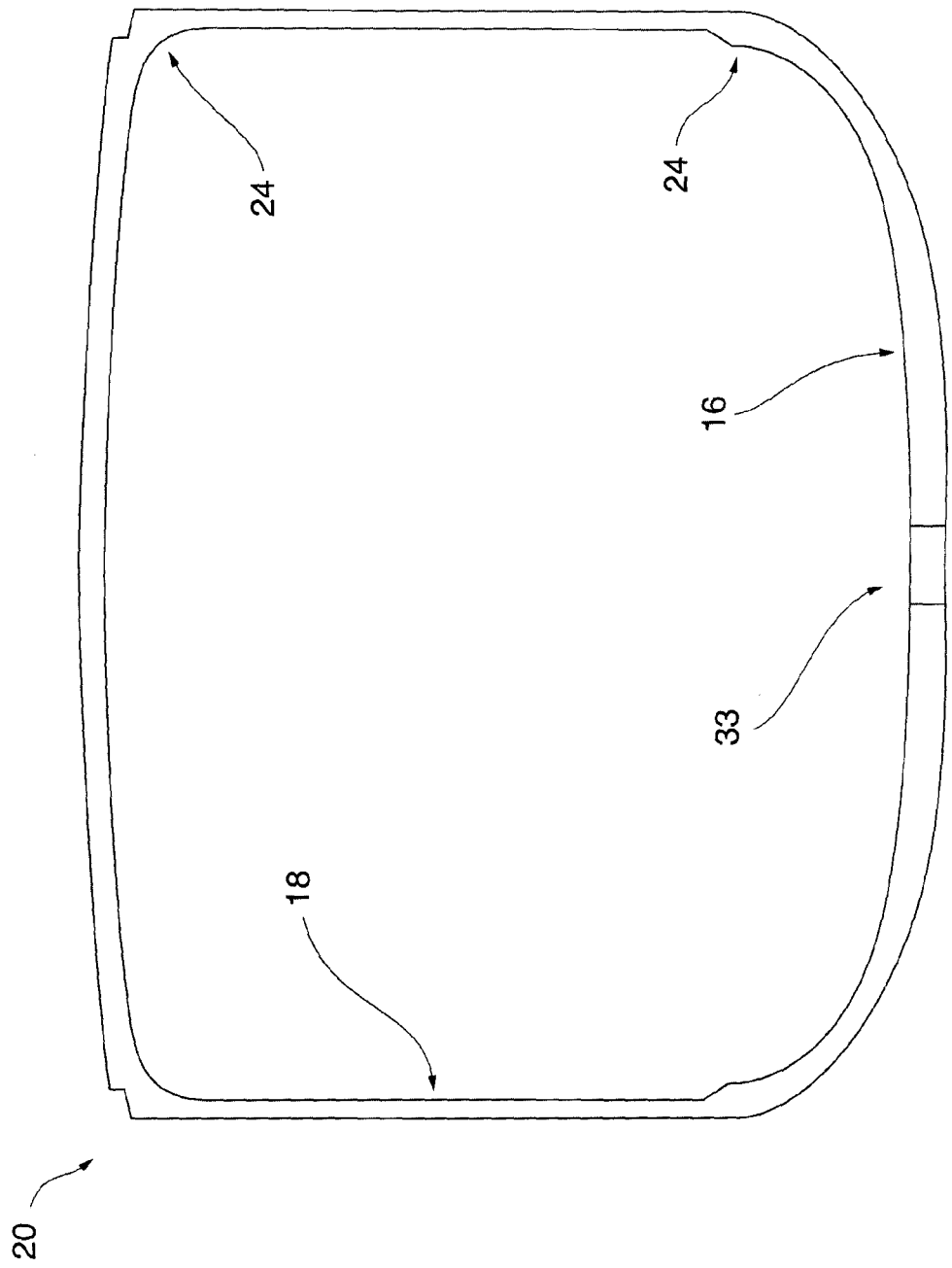
FIG. 2 is a sectional view of the dome end liner part of a cylindrical pressure vessel of FIG. 1.

A lightweight intermodal or road trailer based system in accordance with an embodiment of the invention will now be described with reference to FIGS. 1 to 21. One or more type-4 pressure vessels 10 specifically designed for low-temperature environments and installed into an enclosed and insulated transportation housing 12. The transportation housing 12 can be an intermodal frame or container, a road trailer, etc. The pressure vessels 10 are for the storage of and/or transport of gaseous fluids including, but not limited to, natural gas, liquids of natural gas, hydrogen and air.

The liner 14 of a type-4 pressure vessel 10 is made of a low-temperature and corrosion-resistant polymeric material such as high density polyethylene (HDPE) that is blow molded. The relatively large liner 14 is blow molded in two or more parts designed to provide for a relatively-greater wall thickness 16 at the dome-ended liner parts 20, but with a relatively-smaller cylindrical wall thickness 18 of a body portion of the pressure vessel 10. When blow molding, the dome end is positioned on the bottom of the blow-mold machine (not shown) and centred on a blow pipe/air shaft. This helps to assure a thick wall in the domed end and positions an aperture at the apex of the dome. The blow molding of liner parts 20 leaves little residual stress within the material, thus, toe-in and stress concentrations under refrigerated conditions are significantly reduced. Blow molding of liner parts 20 also ensures low porosity and low permeability as the molecules of the taffy-like HDPE material are first stretched lengthways, and then stretched in the hoop direction when blown outwards.

Figure 3:
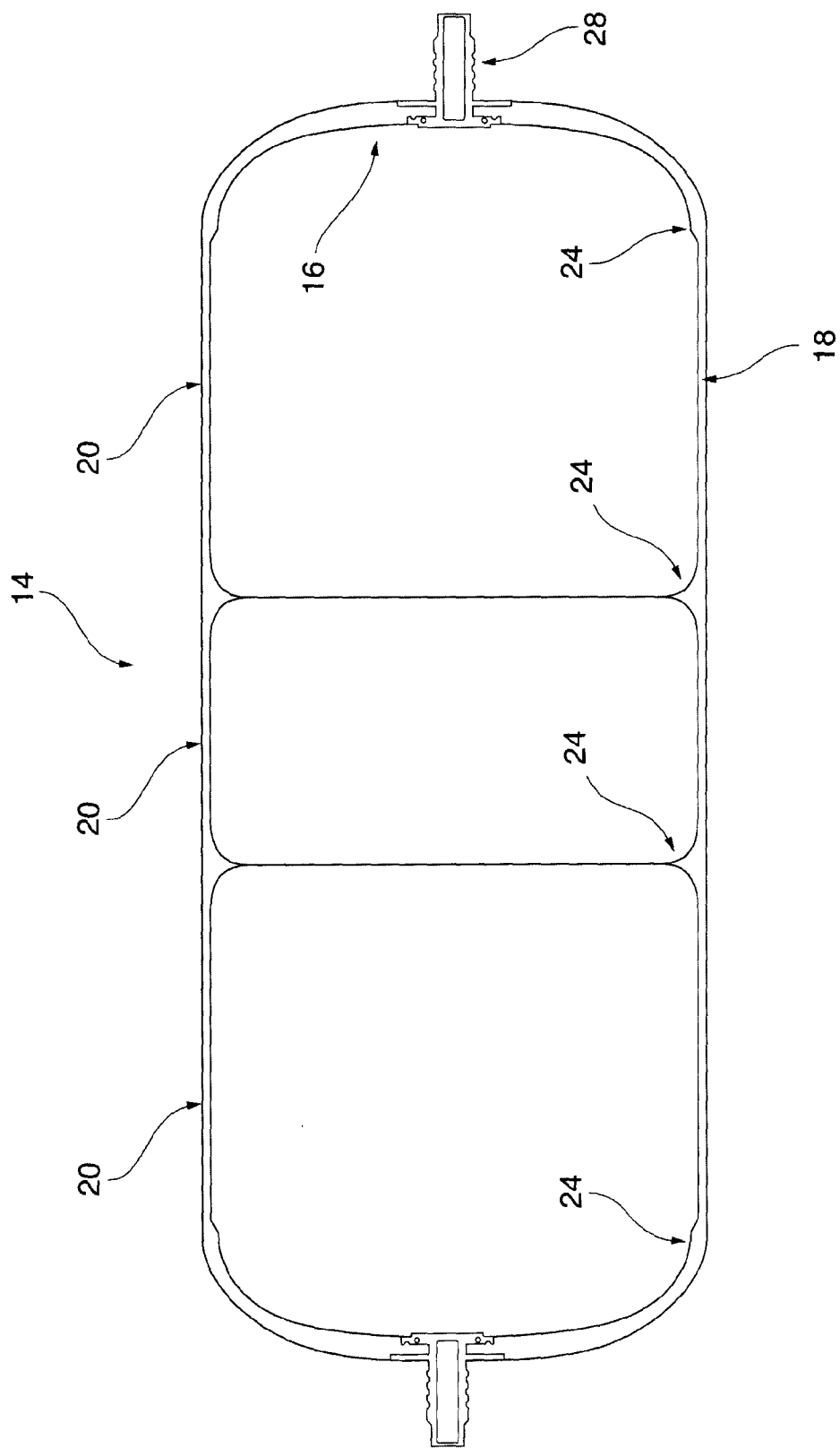
FIG. 3 is a longitudinal cross-sectional view of a cylindrical type 4 pressure vessel liner in accordance with an embodiment of the present invention.
Figure 4:
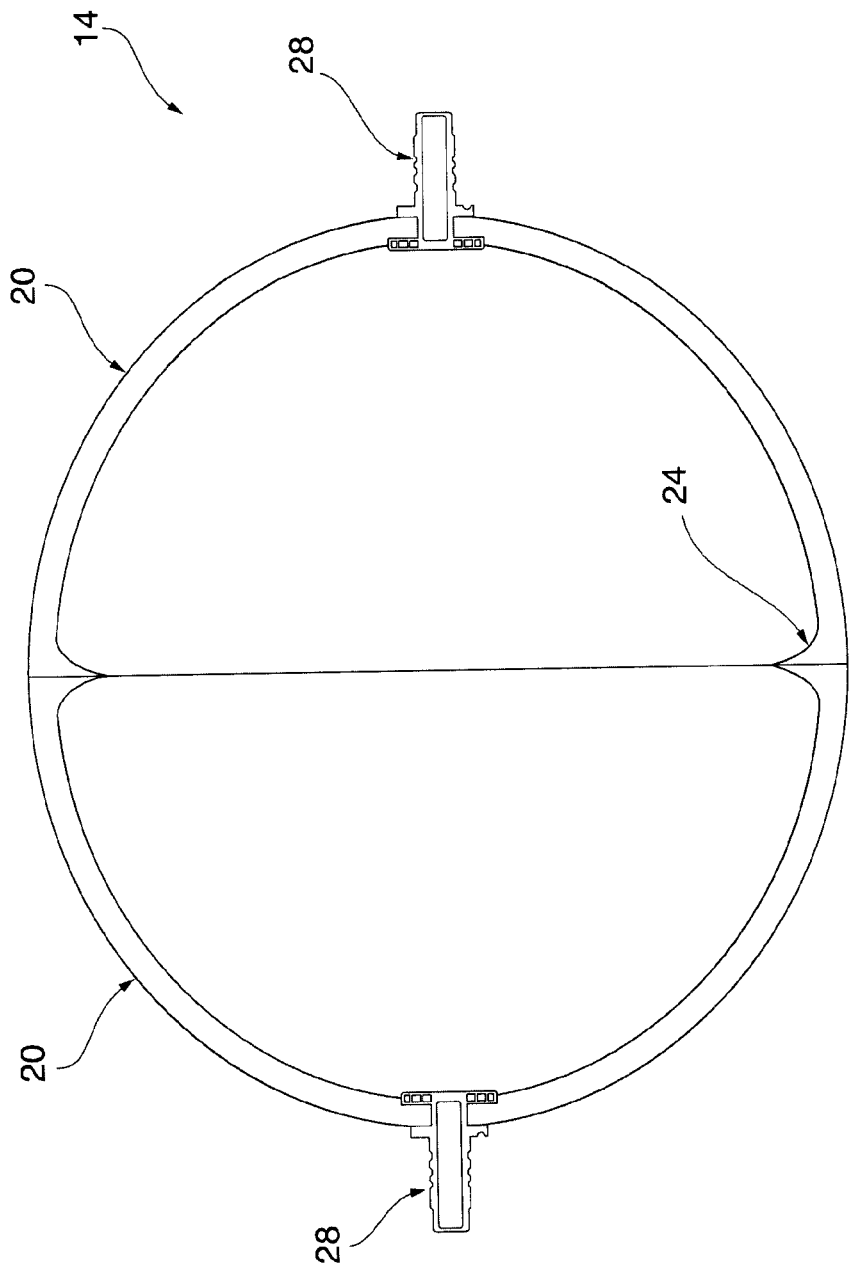
FIG. 4 is a cross-sectional view of a spherical type 4 pressure vessel liner in accordance with an embodiment of the present invention.

To make a complete liner 14, two or more liner parts 20 made from the blow molding process are butt-fusion-welded at thickened cylindrical edges 24, as shown in FIG. 3. These thickened edges 24 provide for a more-secure weld between blow-molded liner parts 20. The thickened edges 24 are created through the design of the mold and programming of the blow-molding machine. At least two liner parts 20 have domed ends with a geodesic section profile to assure isotensoid fiber stress during normal operations. The blow-mold and associated programming also provide for a thicker domed end wall thickness yet a relatively thin main body wall thickness, thickening at the aforesaid cylindrical edge. Should the pressure vessel shape be spherical, such as shown in FIG. 4, having a geodesic shape then becomes redundant. Before the fusion welding of liner parts 20, a two-part polar port boss 28 is affixed to the apex of the dome-ended liner part 20. In alternation to the foregoing embodiment, the liner is roto-molded.

Figure 5:
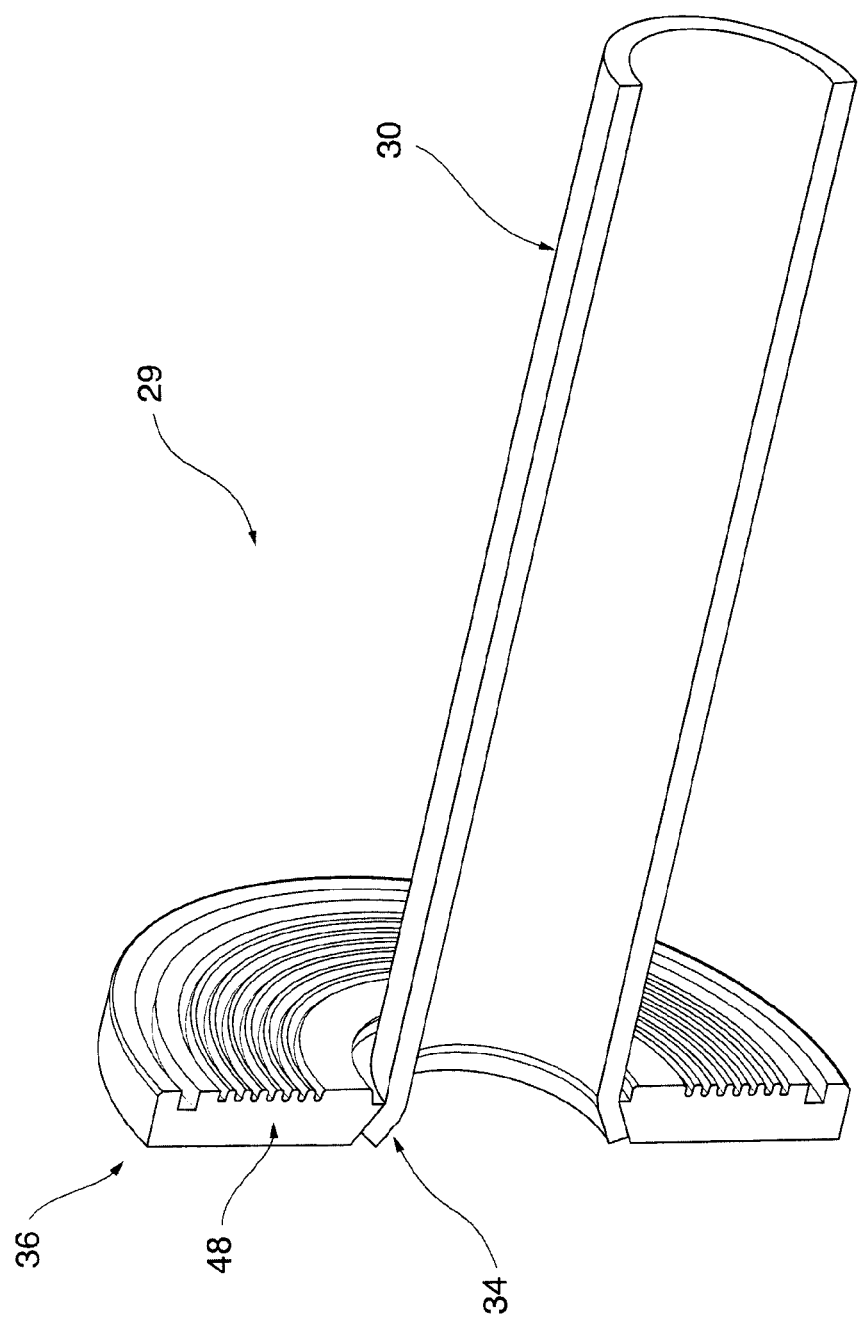
FIG. 5 is a partially cut away longitudinal view of the male inner component of a polar port boss for use with the pressure vessel liner of FIG. 4.
Figure 6:
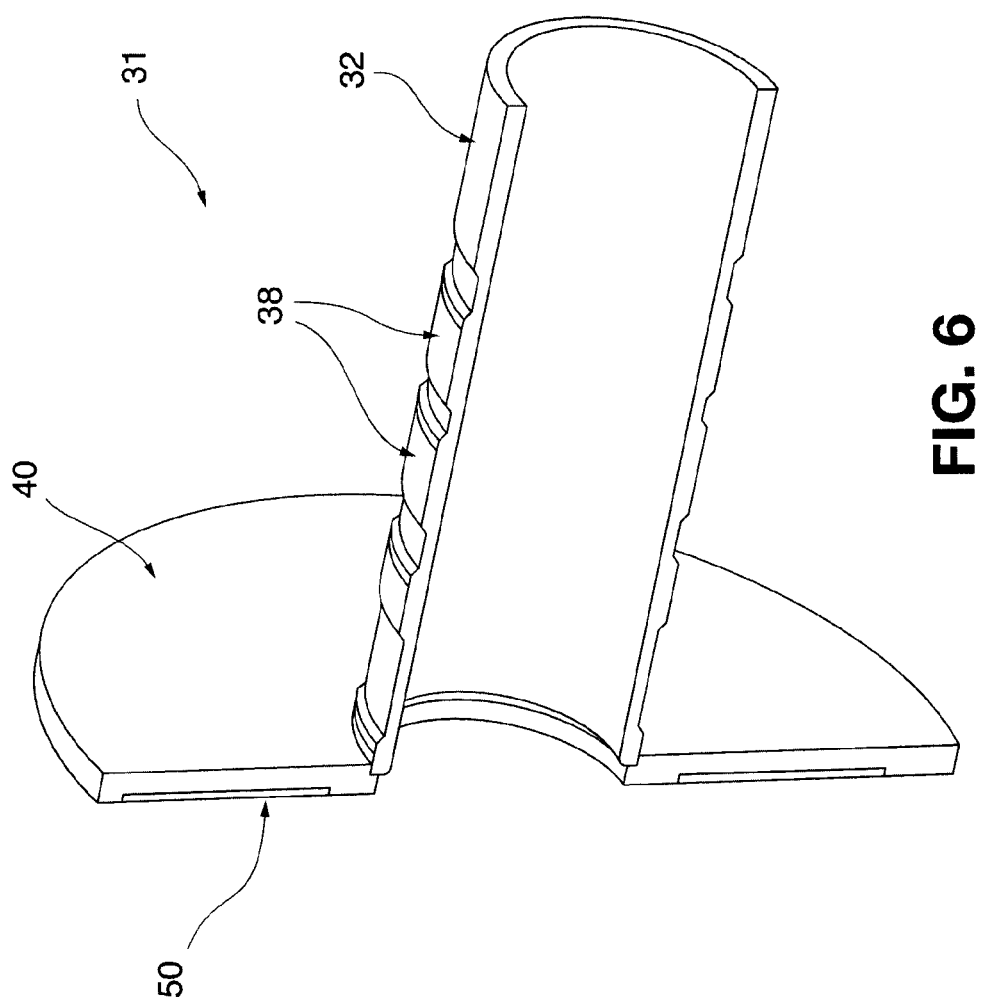
FIG. 6 is a partially cut away longitudinal view of the female outer component corresponding to the male portion of FIG. 5.
Figure 6A:
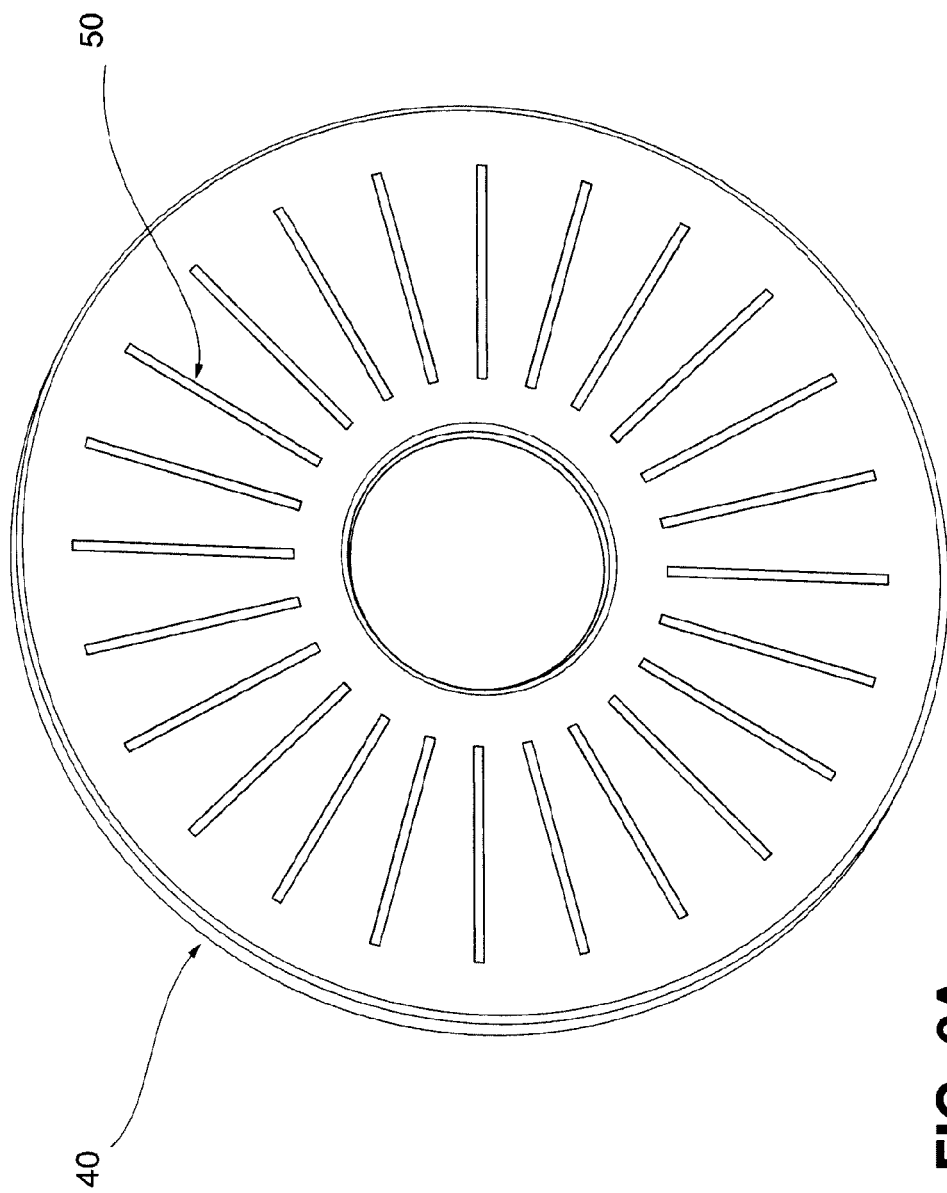
FIG. 6A is a perspective view of the inner surface of the polar port boss of FIG. 6 with grooves machined therein.

FIGS. 5 and 6 illustrate a male inner component 29 and a female outer component 31, respectively, of each polar port boss 28. The male inner component 29 includes of a low-temperature, resistant, metallic pipe 30 that is flared at one end. A metallic inner plate 36 of the same alloy is affixed onto the flared end 34. The female outer component 31 includes of a pipe-type crimp fitting 32 connected axially to a low-temperature resistant metallic outer plate 40 of the same alloy. On the pipe-type crimp fitting 32 may be thinner cylindrical sections 38 for permanently crimping the fitting onto the male inner pipe 30. The plate 40 has a plurality of grooves 50 on its inner surface in a radial or starburst pattern as shown in FIG. 6A.

Figure 7:
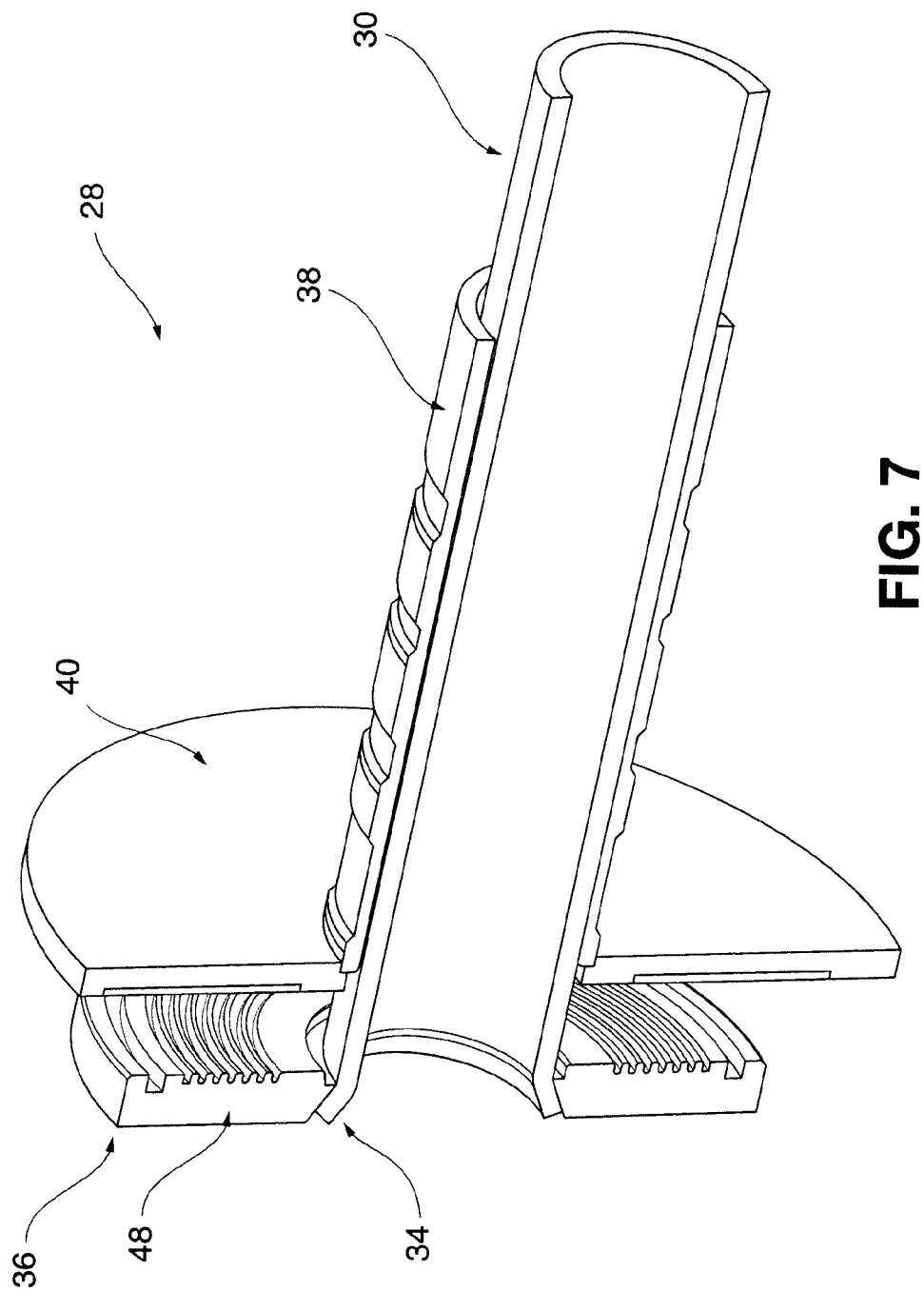
FIG. 7 is a partially cut away longitudinal view illustrating the inter-fit relationship between the port boss components of FIGS. 5 and 6.
Figure 8:
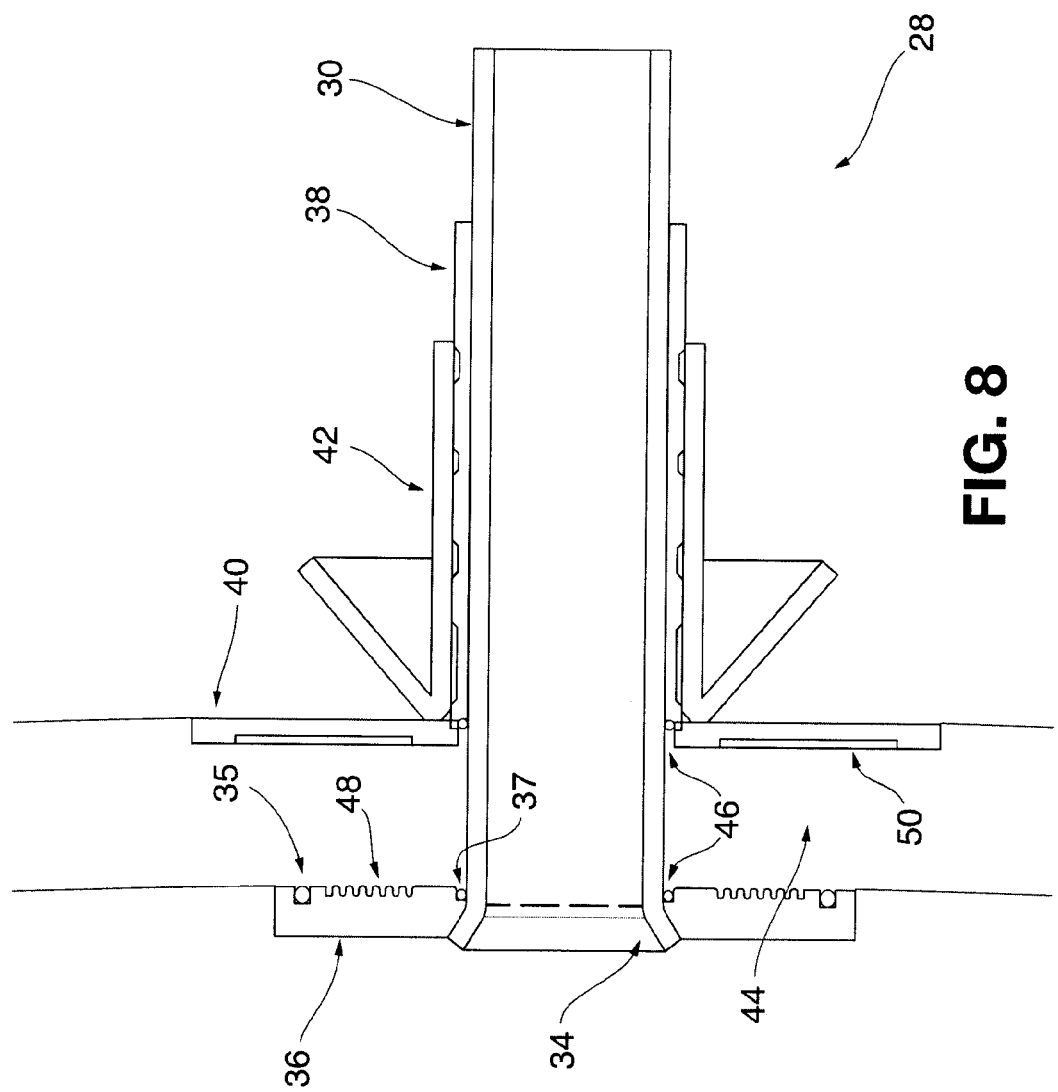
FIG. 8 is a cross-sectional view of the inter-fit port boss components installed onto a dome-ended liner part of a pressure vessel.
Figure 9:
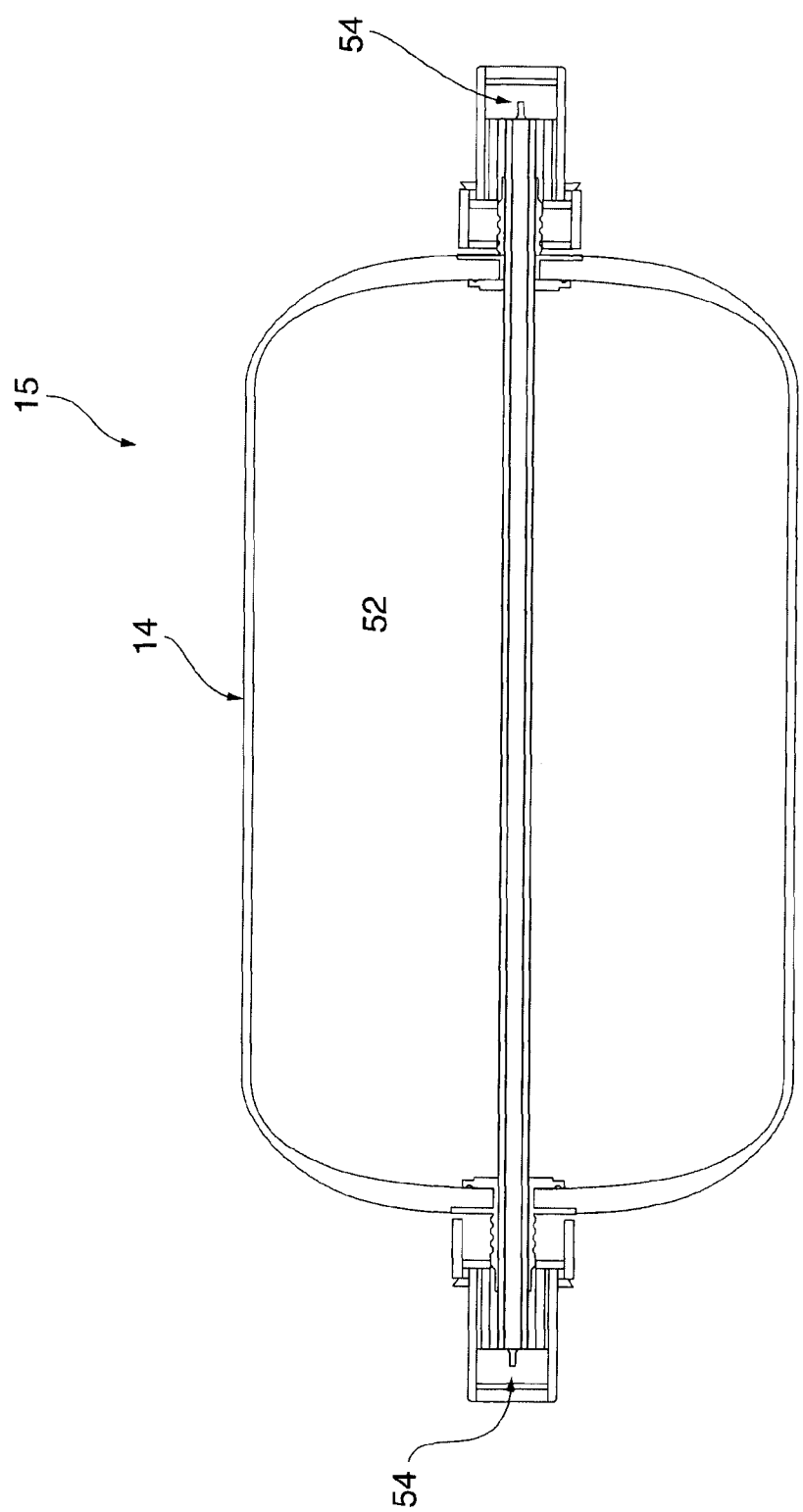
FIG. 9 is a longitudinal cross-sectional view of a cylindrical pressure vessel as a mandrel in accordance with another embodiment.
Figure 10:
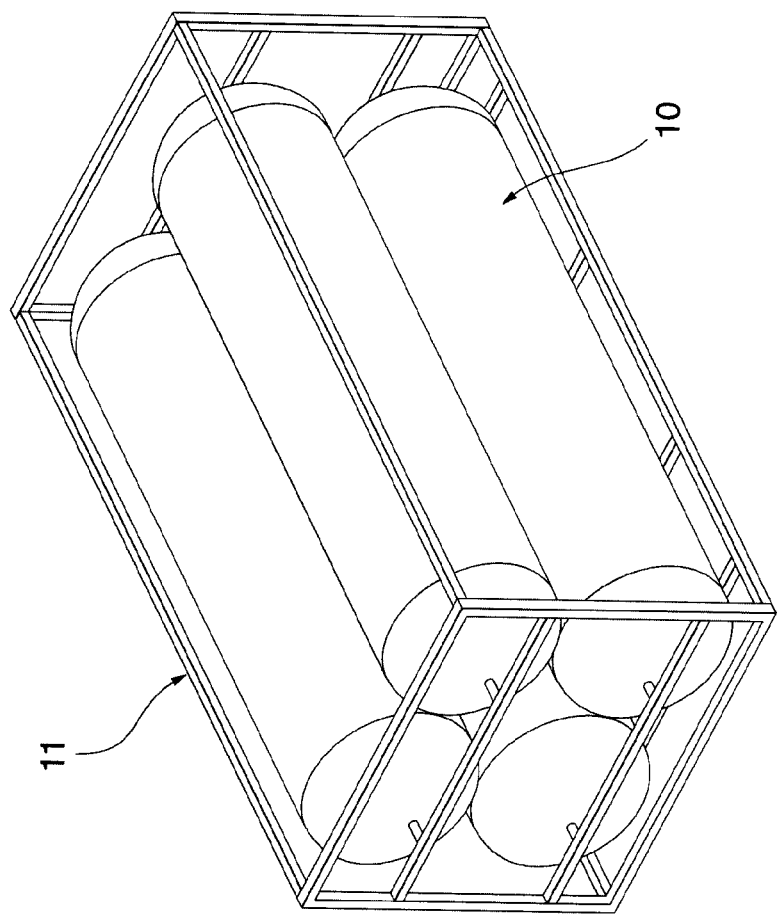
FIG. 10 is a partial perspective view of a type 4 pressure vessel module support frame of FIG. 1 with four cylindrical pressure vessels.
Figure 11:
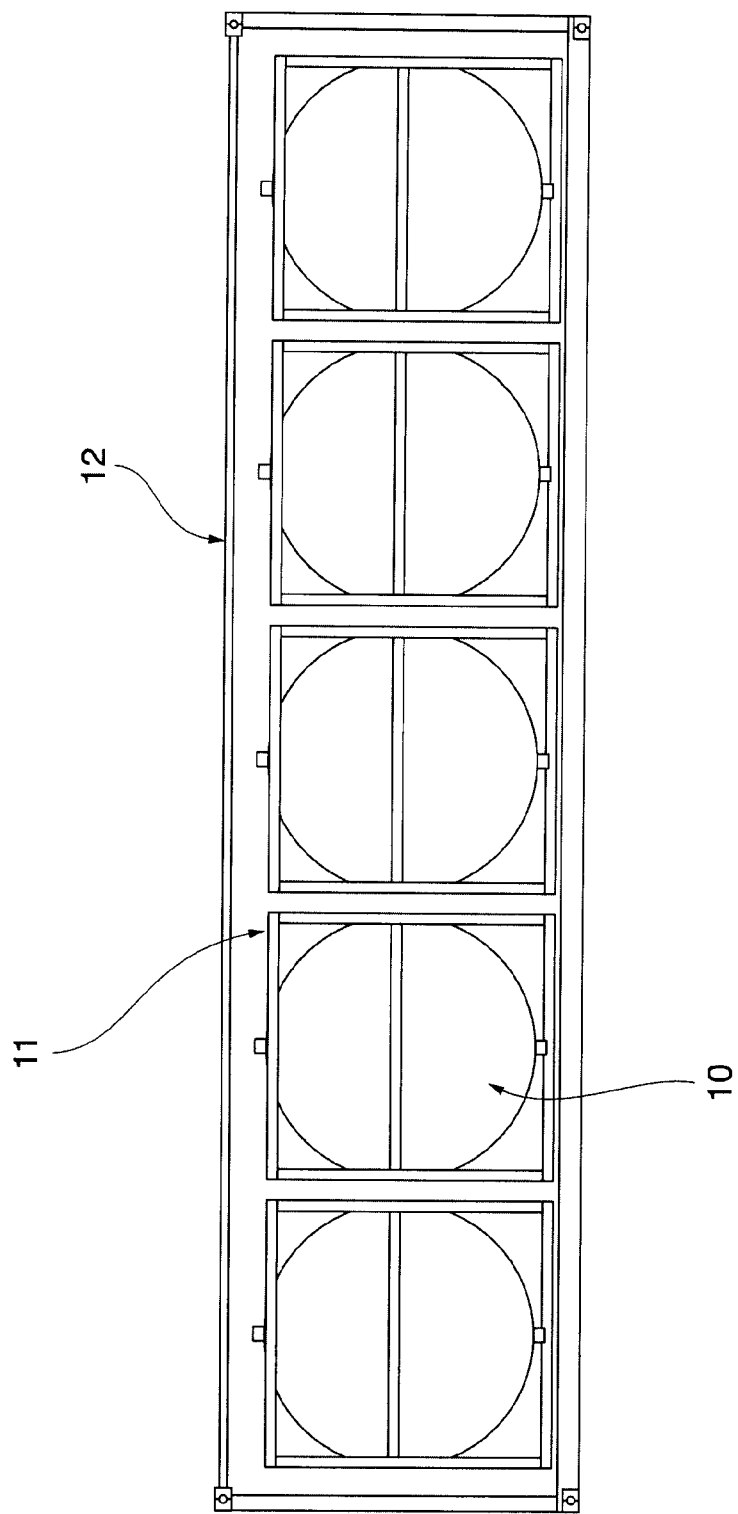
FIG. 11 is a sectional view of pressure vessel module support frames housing spherical pressure vessels such as that shown in FIG. 3 within a standard forty foot intermodal container.

Assembly of a polar port boss is shown in FIGS. 7 and 8. To seat the inner plate 36 onto the flared end 34 of the inner pipe 30, the inside edge of the inner plate 36 is machined to fit onto the flared end 34 of the inner pipe 30. The inner plate 36 is then compressed onto the flared end 34. The flaring of the inner pipe 30 retains the inner plate 36 from slipping off and enhances rotational rigidity. To permanently affix the inside edge of the inner plate 36 to the flared end 34 of the inner pipe 30, a weld is made at the visible edge of the plate/pipe interface at the flared end 34. Due to the compression of the inner plate 36 onto the flared end 34, the weld experiences little if any shear stress during operation. The weld also seals the potential leak path between the inner pipe 30 and inner plate 36. If desired, a sealant may also be used between the inner pipe 30 and inner plate 36 before the compression of the two parts together.

The flaring also provides an operational function as a funnelled nozzle is created at the end of the port boss 28. This reduces flow resistance and the potential of a pressure drop through the end orifice on discharge. By reducing potential pressure drops, Joule-Thomson effects and related negative consequences that can potentially occur at such portals are also reduced.

As shown in FIG. 8, the assembly of the port boss 28 is completed by inserting the male inner component 29 through an aperture 33 in the end dome liner part 20. The aperture 33 is created by the air shaft of the blow-molding machine. If the aperture 33 is not large enough to fit the male inner component 29, then it may be reamed so that the port boss 28 fits to a very close tolerance, i.e. within ten-thousandths of an inch. To access the inside of a liner dome part 20, an access hole is cut into the non-geodesic domed end.

To seat the two components onto the apex of the liner dome part 20, the inner apex area may be machined such that the inner plate 36 fits onto a smooth surface, with minimal polymeric liner material removed. The outer apex area is also machined to a smooth surface, however, the depth of the machined area is such that when the outer plate 40 is seated onto the machined area, the outside edge of the outer plate 40 remains flush with the outside surface of the domed liner part 20. Once the two port boss components 29 and 31 are seated into position, the two opposing plates 36 and 40 are compressed together so that the polymeric liner material between the plates becomes compressed polymeric material 44. The compression will elastically or even plastically deform the liner material. To maintain a flush surface transition between the outer plate 40 and the liner dome part 20, the diameter of the outer plate 40 is made larger than the diameter of the inner plate 36. The result of this is that when the opposing plates 36 and 40 are compressed together, the inner plate 36 will displace relative to the polymeric liner material 44 and outer surface of the outer plate 40, leaving a flush transition between the polymeric liner material 44 and the outside surface of the said outer plate 40.

Once the port boss plates are compressed together so that the spacing between opposing plates is to a specified dimension, the crimp fitting 32 of the female component is cylindrically compressed such that the said fitting is permanently crimped onto the inner pipe 30. This can be accomplished with a singular crimping, however, two or three crimps may be made such that the outer fitting 32 is plastically deformed and the inner pipe 30 is elastically deformed. Such plastic and elastic deformation in combination ensures a bonding tension between the two components. The deformation of the inner pipe 30 may be visible from the inside of the pipe.

The primary seal between the inner plate 36 and sandwiched liner material 44 is an o-ring 35 positioned near the outer edge of the inner plate 36. To accommodate the o-ring 35, a groove is machined into the inner surface of the inner plate 36 near the outside edge. As a secondary seal, a similar o-ring 37 is placed against the interface between the inner pipe 30 and inner plate 36. To accommodate the secondary o-ring 37, a cavity is machined into the inside edge of the inner plate 36. The placement of this o-ring will assure a seal between the inner plate 36 and the inner pipe 30 in the unlikely event that the weld forms a leak.

If desired for added confidence of the seal, a third o-ring may be installed at the interface edge between the outer plate 40 and the crimp fitting 32. To accommodate such an o-ring, a cavity groove is machined into the inside edge of the outer plate 40.

To further enhance the seal between the inner plate 36 and polymeric liner material 44, successive ring grooves 48 are machined into the inner surface of the inner plate 36. When the port boss plates 36 & 40 are compressed together, the polymeric liner material 44 is elastically or plastically deformed into these ringed grooves, each one enhancing the sealing effect of the port-boss liner interface. The ringed grooves 48 also assist in resisting potential pull-out of the compressed polymeric liner material 44 sandwiched between the said port boss plates 36 & 40 which force may be experienced under extreme low temperature conditions.

For additional pull-out resistance between the liner material 44 and port boss plates 36 & 40, the circular cavities to accommodate the o-rings are made sufficient such that when the opposing plates 36 and 40 are compressed together, tabs 46 of liner material 44 are created at the perimeter edge of the dome aperture 33. The tabs 46 resist potential pull out that may occur as a result of thermally generated contraction (or lack thereof) of the liner material 44 relative to the metallic port boss material.

Since extreme low temperature conditions are expected, the metallic port-boss material is one of a low-temperature resistant alloy, including but not limited to stainless steel, aluminum or titanium.

To resist the potentially negative effects of an end-on impact onto the port boss 28, a conical neck 42 is fitted over the crimp fitting component 32 of the said port boss 28 (FIG. 8). The conical neck component 42 is flared outward from the liner 14 such that any end-on impact is distributed to the laminate shell 22 of the pressure vessel 10 and not the liner 14. To secure the conical neck component 42, it is crimped onto the outer female port boss component 31.

As rotational stability of the liner 14 and port boss 28 is critical during the filament winding process, starburst grooves 50 are machined into the inner surface of the outer plate 40. These starburst grooves 50 increase the torsional/shear resistance between the outer port boss plate 40 and the deformed liner material 44.

To enhance the stability of the liner 14 as a mandrel 15 during the filament winding process, the mandrel 15 (FIG. 9) is equipped with an integral winding shaft 52. The winding shaft 52 is firmly attached to both port-bosses 28 so that the rotation of the mandrel 15 from the drive-stock of a filament winding machine drives both port-bosses 28 as opposed to just one. This eliminates potential torsion in the liner 14 during the winding process. The winding shaft 52 is also equipped with seals at both port boss connections, such that during the filament winding process, the mandrel 15 can be inflated with air or an inert gas to help maintain rigidity during the winding process.

To inflate or adjust the internal pressure of the provided mandrel 15 during the filament winding process, a valve 54 is positioned at the end of the winding shaft 52 associated with the tail-stock of the filament winding machine. To ensure axial alignment of the mandrel 15, the inner pipe 30 of the port boss is honed or machined such that less than ten one thousandths of an inch exists between the outer surface of the winding shaft 52 and the inner surface of the inner pipe 30 of the port boss 28.

As the intermodal container 12 used to house the type-4 pressure vessels 10 which store and transport gaseous fluids 26 is to be refrigerated, a "reefer" container 12 may be used as a housing means for the storage and or transport of aforementioned gaseous fluids 26. Such "reefer" containers 12 have walls that are made from rigid foam insulation sandwiched between composite or low-temperature resistant metallic panels. As an alternative, the inside walls of a standard intermodal container 12 made of corrugated metal walls may have rigid, expanded foam or blanket type insulation 81 affixed to the inside surface.

Figure 12:
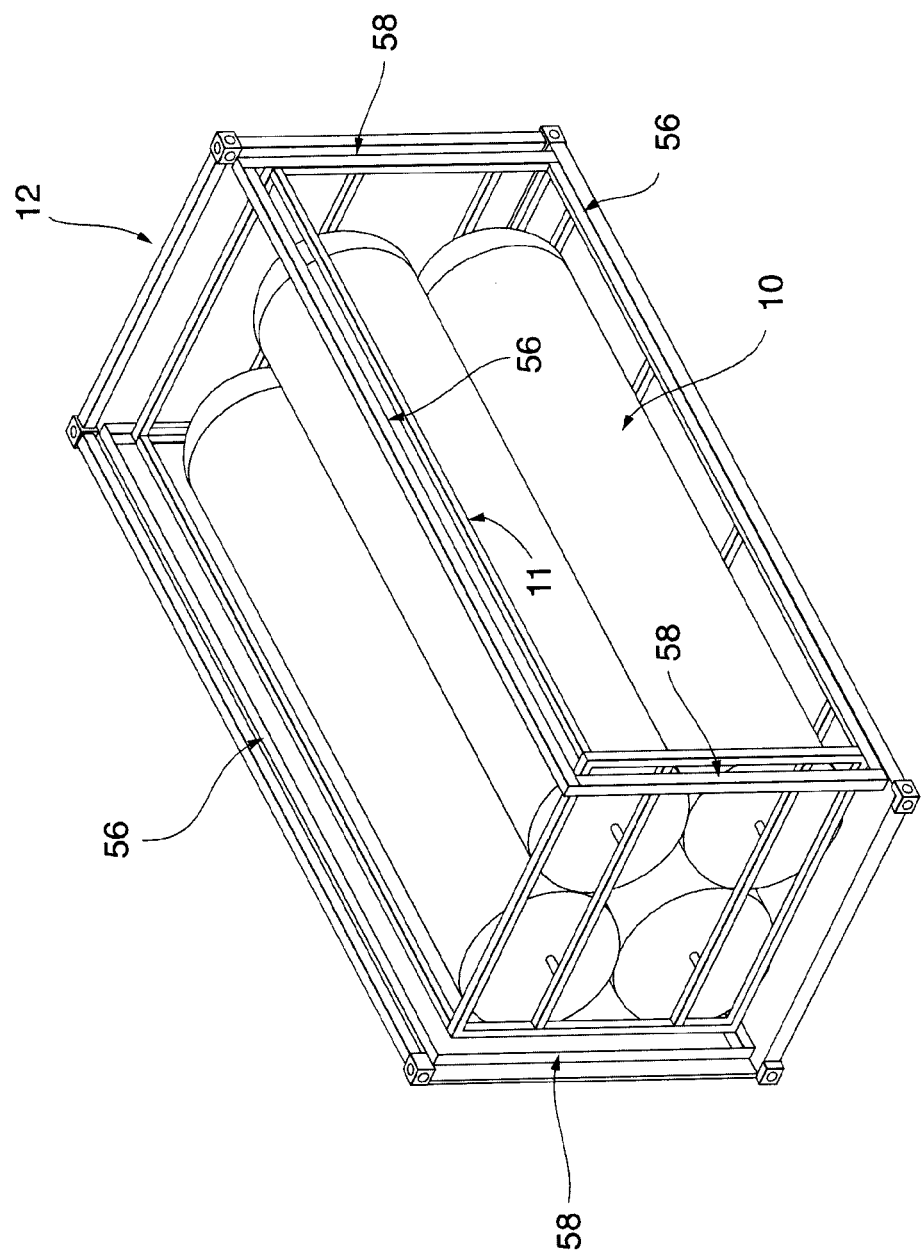
FIG. 12 is a perspective sectional view of a twenty-foot intermodal container having a type 4 pressure vessel module support frame illustrating additional ancillary components associated with the intermodal container.
Figure 13:
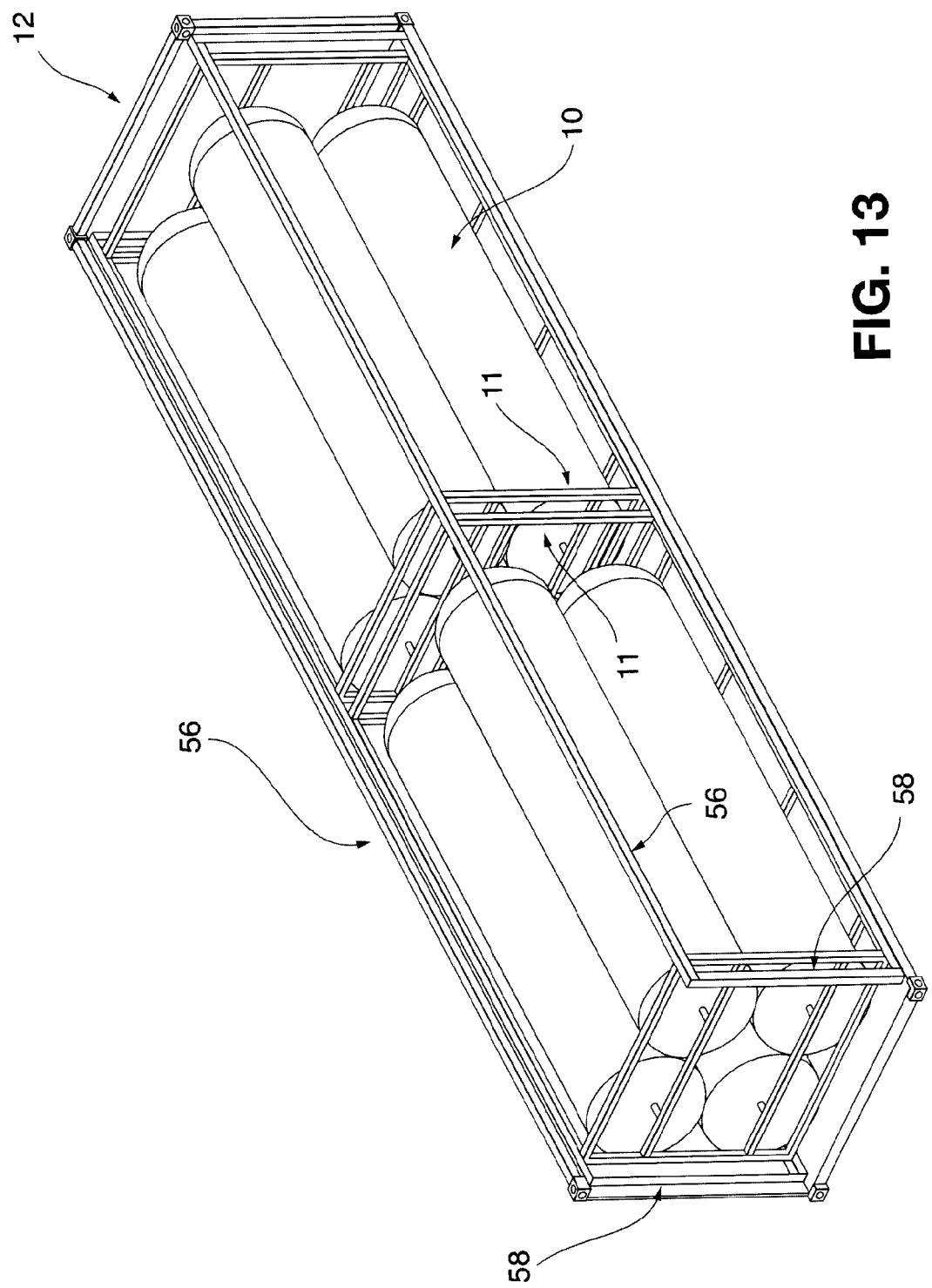
FIG. 13 is a perspective sectional view of two pressure vessel module support frames positioned within a standard forty-foot intermodal container.
Figure 14:
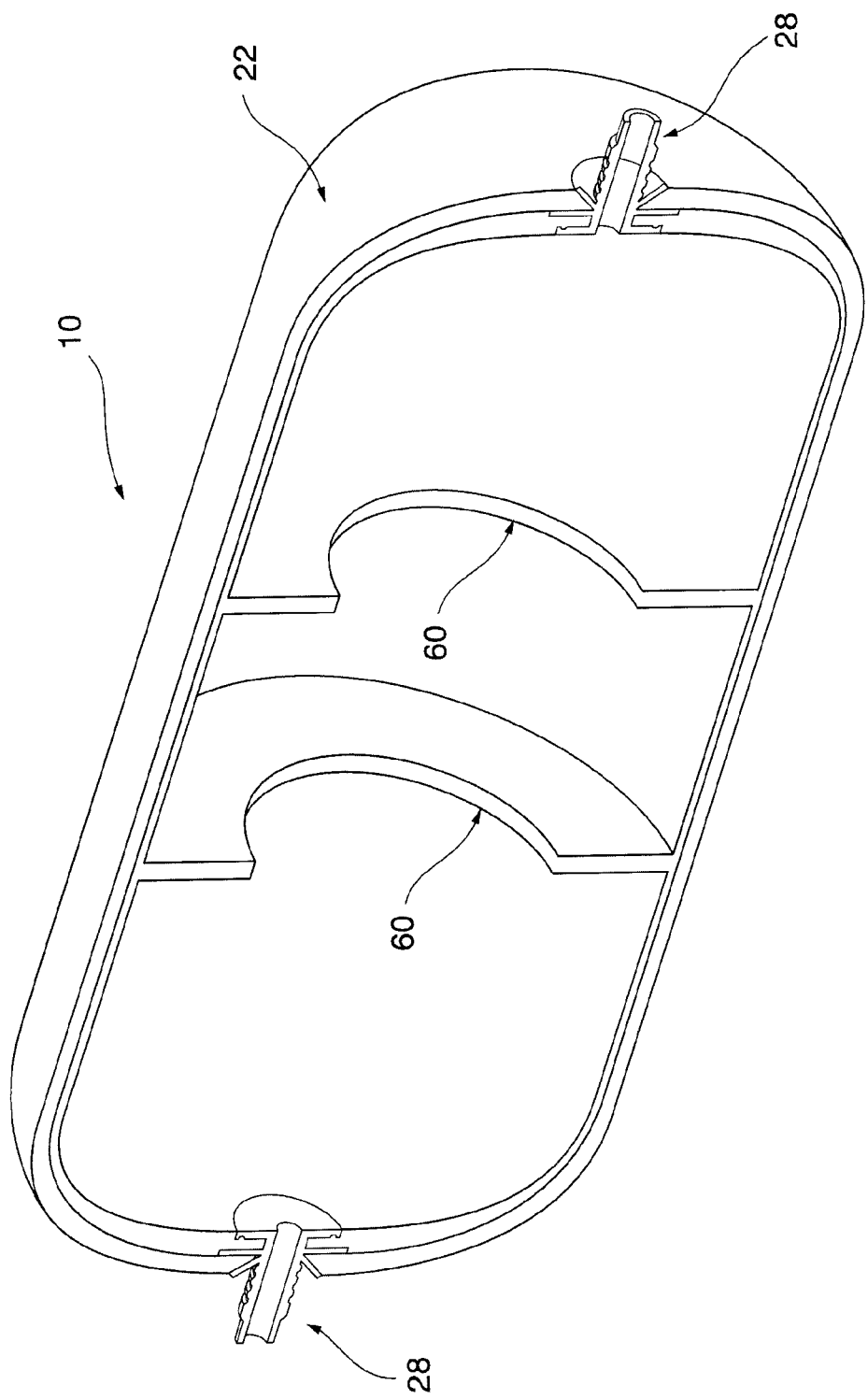
FIG. 14 is a cut away perspective view of a pressure vessel having baffles in accordance with another embodiment.

As regular inspections of the pressure vessels 10 housed inside of the enclosed containers 12 may be required, each pressure vessel support module frame 11 (FIG. 10) is designed for ease of installation, removal, and re-installation into an intermodal container 12. The preferred design is a rectangular frame made of low-temperature resistant metal or composite. The module support frames 11 support either one large type-4 pressure vessel 10 that is spherical (FIG. 11) in either a horizontal or vertical orientation or, multiple cylindrical pressure vessels 10 of approximately 3 feet in diameter in a horizontal orientation. Each module support frame 11 is dimensioned such that it just fits through the end doors of an ISO intermodal container 12. To assist with the installation and removal of the module support frames 11, low-temperature resistant metallic members 56 are installed permanently in the intermodal containers 12. The low-temperature resistant metallic members 56 are positioned at both the upper and lower long edges of the said container 12 with an inner alignment of the said structural members 56 and the corners of the door opening of a container 12 (FIG. 12). When these members 56 are secured to both adjacent planes, they then double as additional structural support to the container 12. Additional vertical members 58 may also be installed adjacent to the vertical edges of the said container 12 to further increase the structural integrity of the said container 12. Once the module frames 11 are in position, they are secured to the additional structural members 56 by either crimping or bolting.

The pressure vessel support frames 11 are sized for flexibility of installation and practicality of operations. The length is to be approximately 17.0 feet long, such that a single frame 11 will fit into a standard twenty-foot ISO reefer container 12 or a twenty-foot ISO shipping container 12. Similarly, two such pressure support frames 11 will fit into a forty-foot Reefer or shipping container 12 (FIG. 13) with room to spare for refrigeration equipment 78 inside of the said container 12. Similarly, three pressure vessel support frames 11 will fit into a fifty-three-foot ISO container 12.

The relatively short length of the type-4 pressure vessels 10 in a frame 11 reduces the potential of sloshing of fluid-like gaseous cargo 26 that is compressed and stored within the pressure vessels 10. To further resist the potentially negative effects of sloshing, at least one baffle 60 (FIG. 14) may exist inside of each cylindrical pressure vessel 10. Such baffles 60 would be made of the same polymeric material as the liner 14 and would be thermo-welded to the inside surface of liner parts 20.

The third reason for having pressure vessels 10 limited to approximately 17.0 feet in length is to be able to support the pressure vessels 10 by the neck in a horizontal orientation. If such pressure vessels 10 were much longer, a neck type support system may not be practical. Designing for a neck type support of the pressure vessels 10 allows for complete visual inspection of the outside surface as may be required for regular inspections by regulatory agencies. It also eliminates the potential of stress concentrations to the sidewalls during normal operations.

Figure 15:
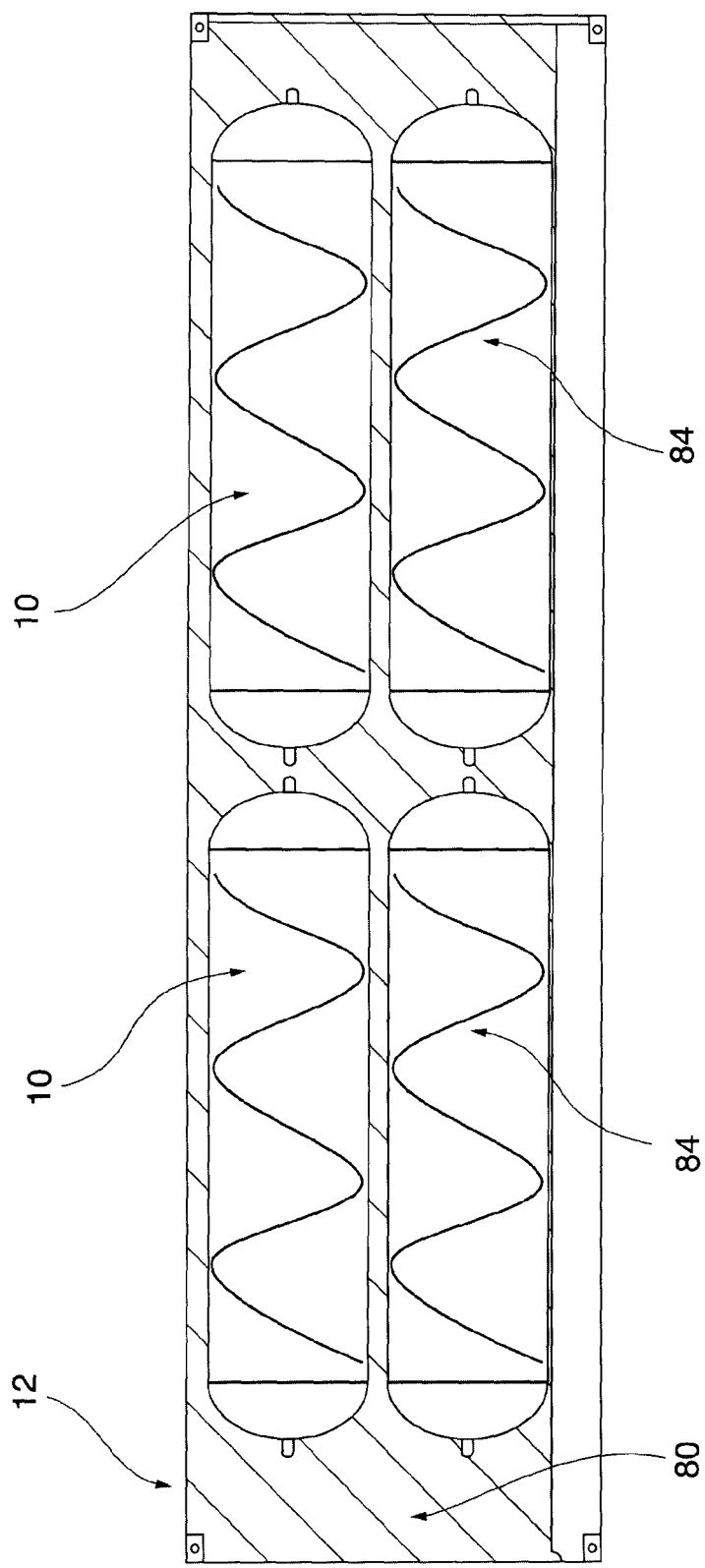
FIG. 15 is a longitudinal cross-sectional view of a intermodal container illustrating foaming insulation and fiber optic cable positioned about cylindrical type 4 pressure vessels.
Figure 16:
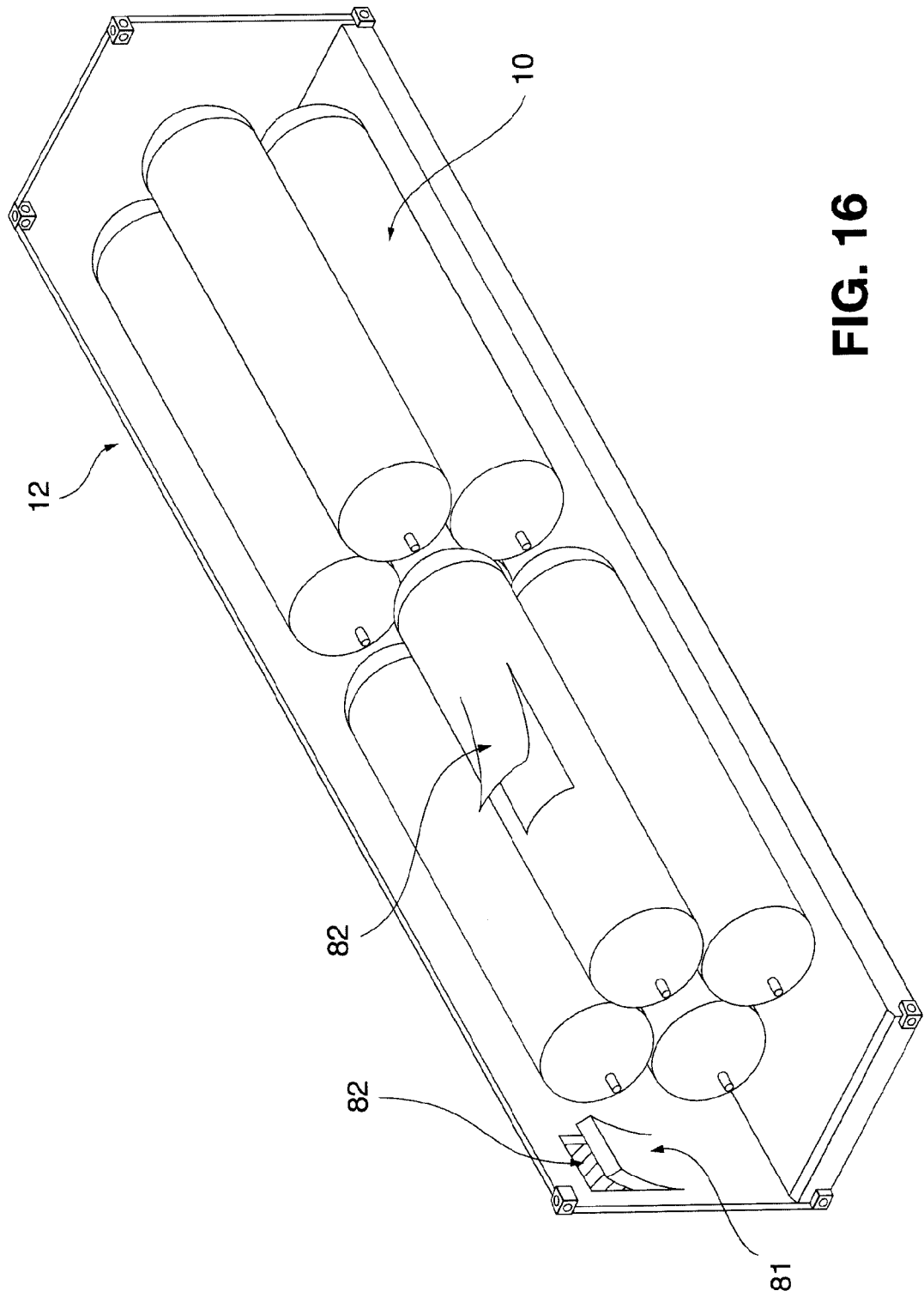
FIG. 16 is a perspective sectional view of pressure vessels housed within an intermodal container illustrating a non-stick film material installed around the pressure vessels as well as a non-stick material and blanket-type insulation installed on the inner container walls.
Figure 17:
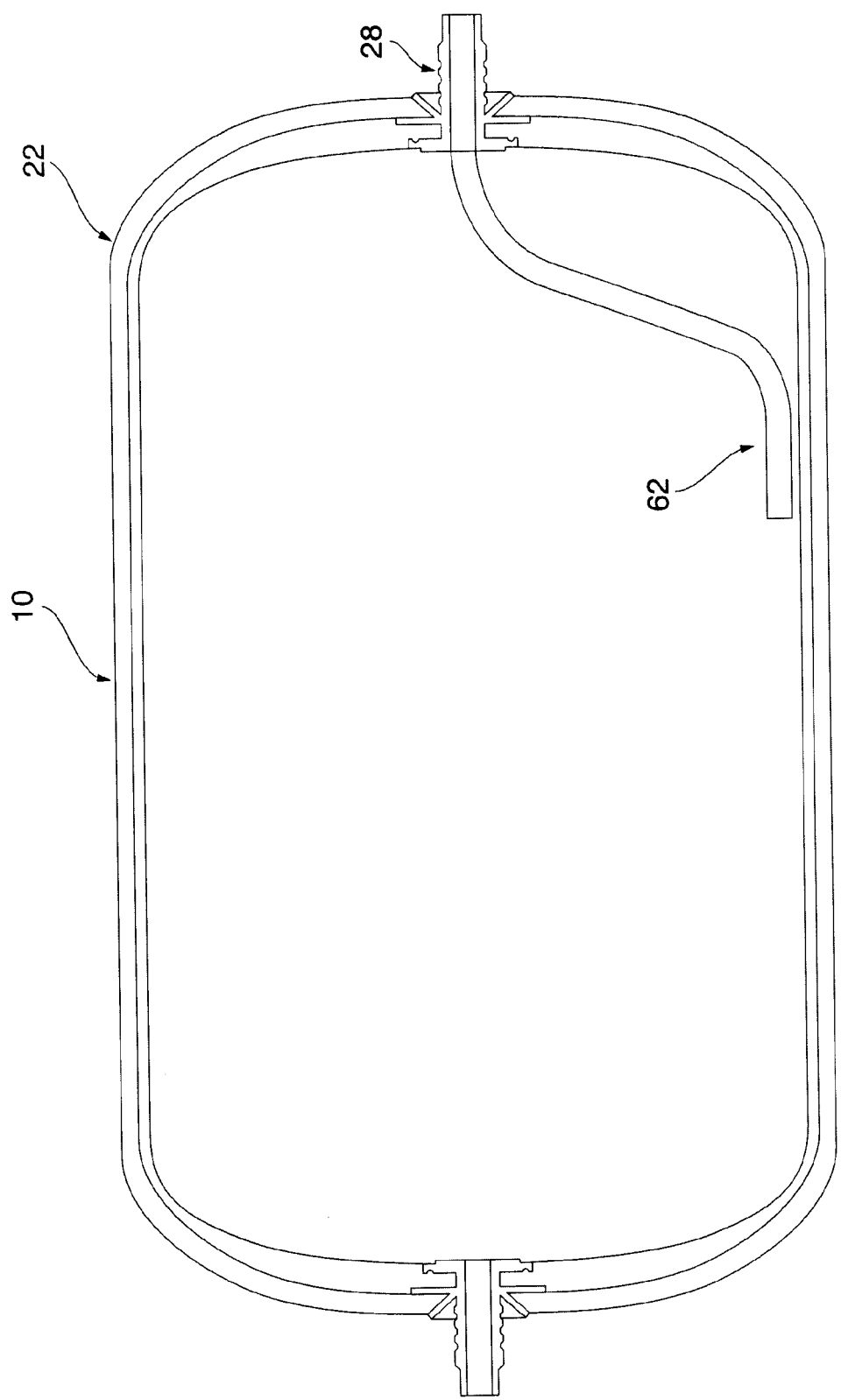
FIG. 17 is a longitudinal cross-sectional view of a cylindrical type 4 pressure vessel illustrating the positioning of a dip-tube within the vessel.

As said type-4 pressure vessels 10 are intended to be used in a refrigerated environment, rigid foam insulation 80 shown in FIG. 15 is used such that all voids outside of the pressure vessels 10, but inside the outer perimeter of the support frame 11 are filled with insulation 80. No voids would exist inside of the perimeter of the said module support frame 11. The insulation 80 may be composed of both rigid and blown foam. In addition, blanket type insulation 81 may be affixed to the inner surfaces of the intermodal container walls.

Since blown foam insulation 80 may stick to the outside walls of the pressure vessels 10, a thin layer of sacrificial non-stick material 82 (FIG. 16) such as polyethylene or polypropylene is wrapped around the said pressure vessels 10 before any blown expanding foam insulation 80 is used. As each module support frame 11 is installed, foam insulation 80 may then be blown into the void space between the support frame 11 and the insulated walls of the intermodal container 12. Similarly, a film-type sacrificial layer of material 82 may be placed both beneath and over the insulation 81 covering the inside walls of the container 12, such that any blown-in expanding foam insulation 80 does not stick to the said container wall or its insulation 81.

As liquids or fluid-like gas is anticipated to exist inside of the type-4 pressure vessels 10, a dip-tube 62 (FIG. 17) is connected to one port boss 28 of each pressure vessel 10 positioned in a horizontal orientation. The purpose of the dip-tube 62 is to extract liquids or fluid-like gas that has settled to the lower side of the said pressure vessel 10 (in a horizontal orientation). The dip-tube 62 is of such a length and flexibility in bending that the end touches or nearly touches the inner side wall of the pressure vessel liner 14 at a lower most elevation. The second purpose of the dip-tube 62 is to potentially percolate gas being loaded into the said pressure vessel 10 through liquids that may purposely remain inside of the pressure vessel 10 after gas discharge. The liquids may be that of natural gas wherein such natural gas liquids are used as solvents in natural gas to increase the density of the net gas volume without requiring additional pressure or refrigeration.

Figure 18:
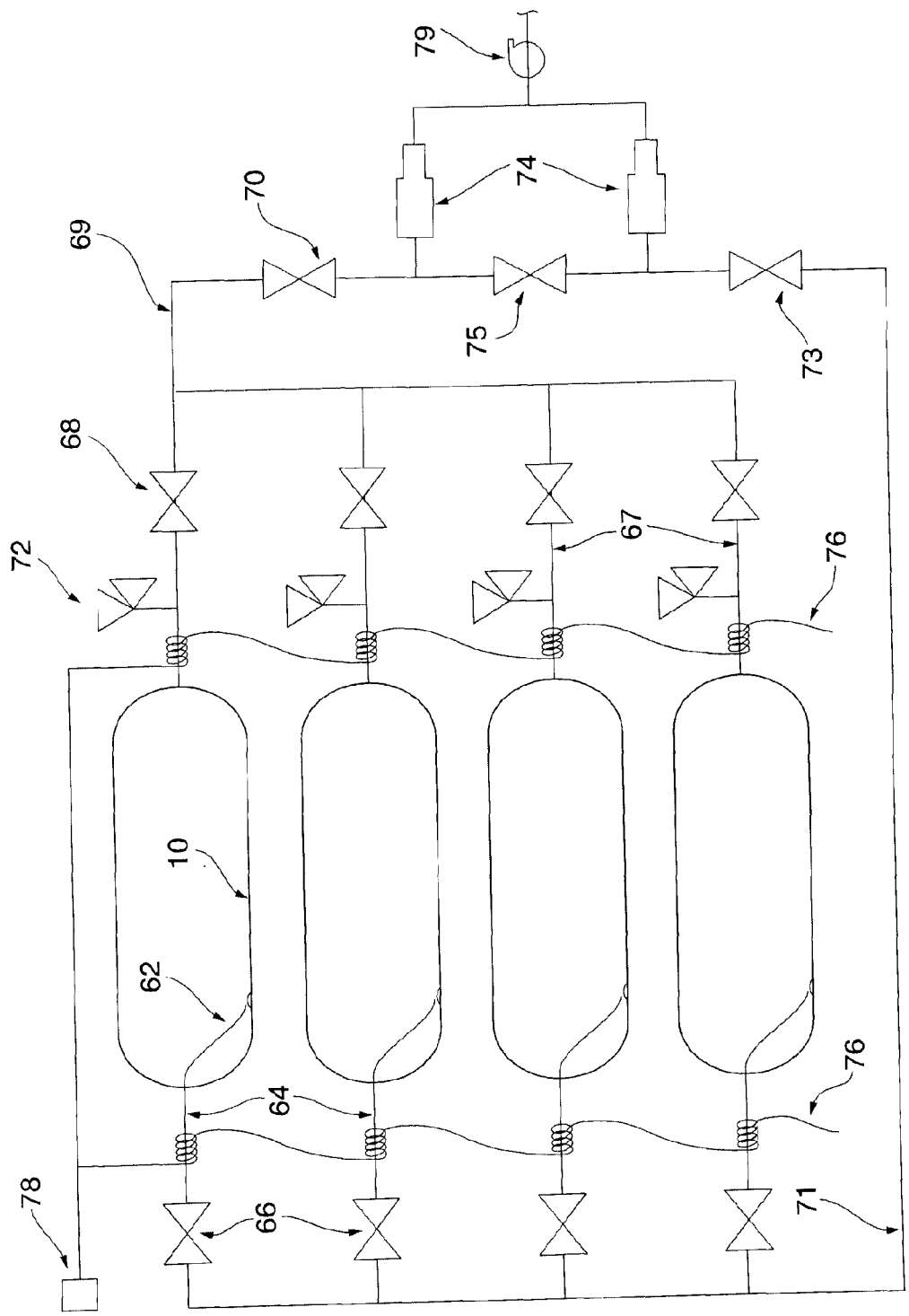
FIG. 18 is a schematic illustration of a series of interconnected pressure vessels and a valving mechanism and network associated therewith.

To facilitate the loading and unloading of either gas or liquids, the port boss 28 associated with the dip-tube 62 is connected to a liquids connecting pipe 64 (FIG. 18). The liquids connecting pipe 64 would be extended to the operations hatch or door of the container 12 where it is terminated with a liquids isolation valve 66. The liquids isolation valve 66 provides a means to isolate the respective pressure vessel 10 on the end associated with the dip-tube 62.

The opposing port boss (without a dip-tube 62) is connected to a gas connecting pipe 67 that also extends to the operations hatch or door (not shown) of the container 12. The gas connecting pipe 67 similarly terminates with a gas isolation valve 68, however, just before the terminating gas isolation valve 68 of each pressure vessel 10 is located a pressure relief valve 72.

The main purpose of the isolation valves on each of the liquids connecting pipe 64 and the gas connecting pipe 67 is to isolate each and every pressure vessel 10 for maximum safety during storage and especially during transport.

Each pressure relief valve 72 is connected on the downstream side to an open ended vent pipe (now shown). The forgoing arrangement allows for each pressure vessel 10 housed within the said intermodal container 12 to be isolated, yet provide for over-pressurization protection.

To load and unload gas or liquids, one or more pump(s) 79 is connected to one or more quick-connect nozzle(s) 74. The quick-connect nozzles 74 are attached to both a gas manifold connection isolation valve 70 and a liquids manifold connection isolation valve 73. The said gas manifold connection isolation valve 70 is also attached to a respective gas manifold 69. Likewise, the said liquids manifold connection isolation valve 73 is respectively attached to a liquids manifold 71. The gas manifold 69 connects to all gas isolation valves 68. Similarly, the liquids manifold 71 connects to all liquids isolation valves 66. Between each successive quick-connect nozzle 74 may be positioned a dual purpose isolation valve 75 such that one or all quick-connect nozzles 74 can be connected to the pressure vessels 10 either through the gas isolation valves 68 or the liquids isolation valves 66. This arrangement would also allow for both the gas manifold 69 and the liquids manifold 71 to be used together to load or unload gaseous fluids 26 to or from the type-4 pressure vessels 10.

To refrigerate or heat the gaseous fluid cargo 26 inside of the said type-4 pressure vessels 10, cooling/heating lines 76 are placed in direct connection with the outside surfaces of either or both the gas connecting pipes 67 or the liquids connecting pipe 64 (FIG. 18). This direct connection to the said pipes allows for refrigeration and or heating of the pressure vessels 10 and the gaseous fluids 26 within while also eliminating the need for a condenser or evaporator inside of the host container 12. This is most advantageous as there is no void space within the said container 12 to operate an evaporator or condenser.

To provide refrigeration or heating directly to the pressure vessels 10 and gaseous fluids 26 within, the said cooling/heating lines 76 are connecting to a refrigeration/heating unit 78 that is attached to or enclosed within the host container 12. In alternate, the cooling/heating lines 76 may be connected to a refrigeration/heating unit 78 that is remote from the host container 12 but, connected thereto by extended cooling/heating lines 76.

To eliminate the potential requirement for visual inspections of the pressure vessels 10 inside of the host intermodal container 12, the pressure vessels 10 may have a light activated fiber optic cable 84 (FIG. 15) wrapped around the pressure vessels 10 for the purpose of monitoring strain and temperature in real time. The fiber optic cable 84 would be interconnected such that all pressure vessels 10 inside of a host container 12 could be monitored with a singular light source. The fiber optic cables 84 could also be wound within the layers of the filament fibers of the laminate shell 22 of the type-4 pressure vessel 10.

To avoid the potential of a gaseous fluids leak from any of the fittings connecting the piping, excluding the pressure relief valve connections, all such connections of piping inside of the host container 12 are by retaining ring flanges or similar non-welded connections.

Figure 19:
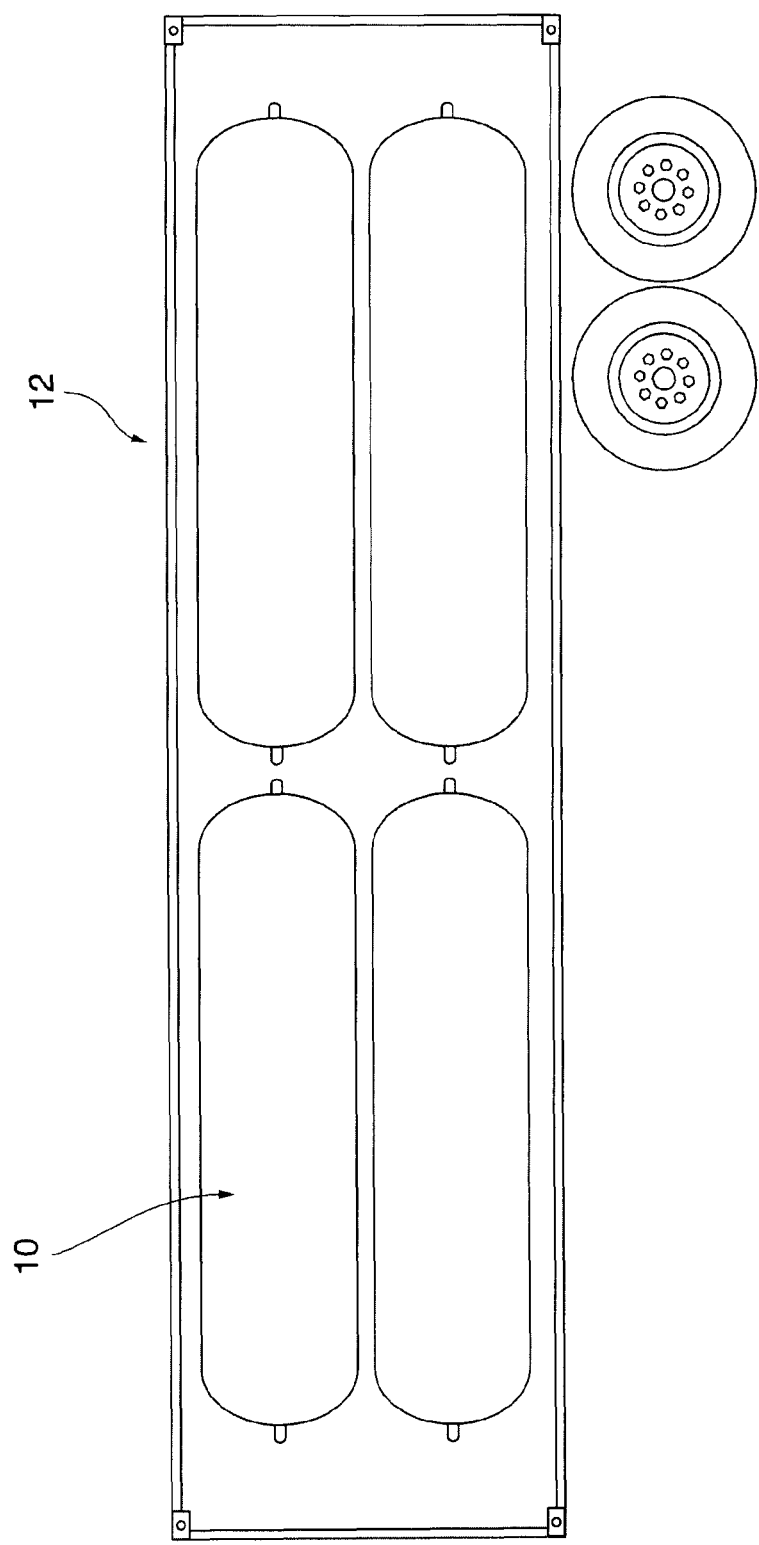
FIG. 19 is a longitudinal cross-sectional view of type 4 pressure vessels housed within a road trailer.
Figure 20:
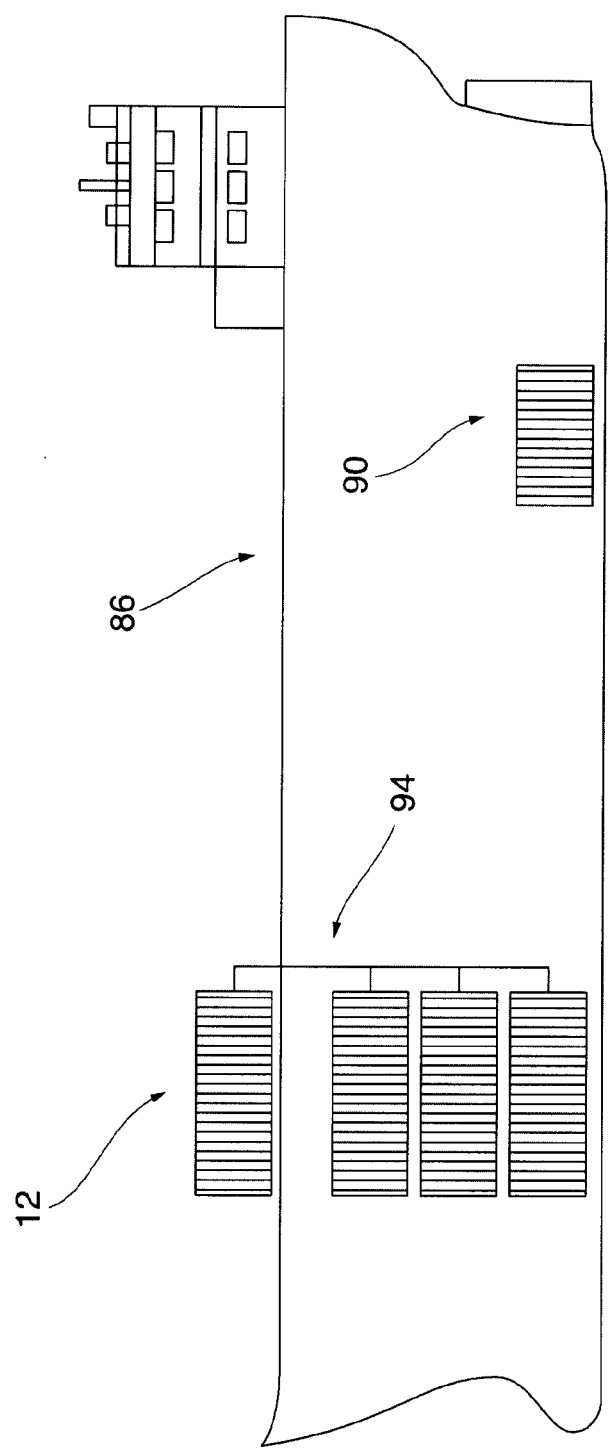
FIG. 20 is an illustration of a ship holding a set of intermodal containers for the transportation of gaseous fluids.

Although the foregoing preferred embodiment is for the storage and or transport of gaseous fluid under refridgerated conditions in intermodal containers, the same will bode for road trailers of similar dimensions (FIG. 19).

For the transport of relatively large volumes of gaseous fluids 26 in a marine environment, numerous containers 12 containing pressure vessels 10 are assembled on a ship 86 (shown in FIG. 20) or barge 88 (shown in FIG. 21) and interconnected 94 so that the ship 86 or barge 88 becomes a gaseous fluids transport vessel. The advantage of using interconnected 94 intermodal containers 12 on a ship 86 or barge 88 is that ventilation of the system inside of the container 12 is not required as no void spaces exist within the containers 12. The outside of the intermodal containers 12 are resistant to marine environments and thus, it can be ventilated with sea air. The conversion of an existing ship 86 or barge 88 into a gaseous fluids transport vessel using interconnected 94 containers 12 with low-temperature resistant type-4 pressure vessels 10 inside provides a significant cost advantage over a newly built ship 86 or barge 88 gas transport system.

The interconnection 94 of numerous containers 12 on a ship 86 or barge 88 is made using crimped connection fittings so that the potential of a leak through a connection in the hold or on deck is eliminated without requiring the welding of pipes and fittings.

To avoid the requirement of a compressor to load or unload gaseous fluids 26 into or from the pressure vessel containment system, the low pressure gaseous fluids 26 are chilled so that the density is increased to approximately 300 kg/m$^3$. At this density, special pumps 79 currently used in the petrochemical industry (but not for natural gas) can be used to increase pressure and density. For further pressurization, pumps 79 similar to those used to pressurize and move conventional liquefied natural gas (LNG) are used.

To load conventional LNG into the gaseous fluids storage and transport system, the LNG is pressurized by means of pumping and heated to approximately minus one hundred (−100) degrees Celsius or warmer, and loaded into the storage and transport system. The gas is then transported to a market terminal as pressurized liquefied natural gas.

Figure 21:
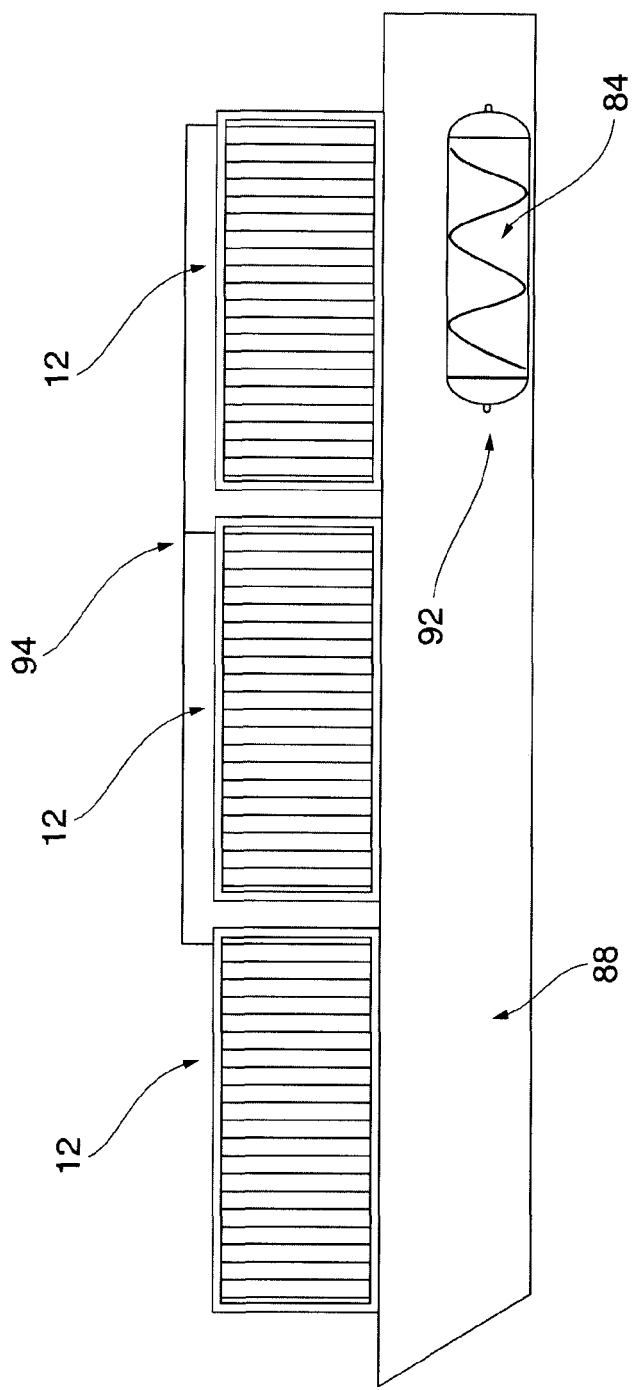
FIG. 21 is an illustration of a marine barge holding a set of intermodal containers for the transportation of gaseous fluids.

Using the intermodal nature of the gas containment system, one or more containers 12 are installed on the deck or within the hull of a ship 86 or barge 88 to store natural gas used as a fuel 90 to power the said ship 86 (FIG. 20) or barge 88. In some situations, just the low-temperature resistant type 4 pressure vessels 10 themselves are used to store natural gas as fuel 92 for a ship 86 or barge 88 (FIG. 21).

To store or transport wellbore fluids, free water is first removed. The remaining mixture may then be refrigerated and loaded into the said type-4 intermodal storage and transport system, for safe and efficient storage and/or transport.

In terms of other features of the invention, the following are important aspects:
 i. The wall thickness of the liner parts at weld lines is greater than the thickness of the remaining area of said liner;
 ii. One or more baffles made from the polymeric liner material are installed inside of the liner parts prior to fusion welding of the said liner parts;

iii. The port boss comprises a plurality of components that fit integrally together and are compressed onto a liner dome apex then cylindrically crimped together to permanently affix the port boss components to each other and to the apex of the polymeric liner dome;
iv. The port bosses comprise two distinct parts;
v. Each port boss comprises a low-temperature resistant metallic pipe male component with a complimentary plate connected at one end and a second part comprising of a low-temperature resistant metallic female fitting for crimping onto said pipe connected to a complimentary plate at one end;
vi. The complimentary plate on male pipe component is the inner plate and may be smaller in diameter than the female component outer plate;
vii. The inner plate has an o-ring positioned on the inside face near the outer edge;
viii. The inner plate has an o-ring positioned at the interface between its inner edge and the outer diameter of the low-temperature resistant metallic pipe;
ix. The inner plate has a plurality of grooves machined in a ring pattern on the inside face of the said plate;
x. The outer plate has grooves machined in a starburst pattern on the inner surface of the outer plate;
xi. The compression is sufficient to elastically or plastically deform the polymeric liner material sandwiched between the two components of said port boss;
xii. The grooves are machined into either or both the inside face of the inner plate and the inside face of the outer plate adjacent the inner pipe component of a port boss;
xiii. The low-temperature resistant metallic pipe is flared at the end connected to the inner plate;
xiv. The low-temperature resistant metallic female fitting is fabricated with thinner cylindrical sections to aid in crimping onto the low-temperature resistant metallic male pipe;
xv. A conical neck is installed onto the outside of the low-temperature resistant metallic female fitting;
xvi. The filament winding of the fiber reinforced plastic shell onto the liner is facilitated through use of an integral winding shaft, securely connected to both port bosses;
xvii. The integral winding shaft forms an airtight seal between the port bosses;
xviii. The integral winding shaft is equipped with a valve and stem to pressurize the inside of the liner during the filament winding process;
xix. The frame has a length dimension of approximately 17.0 feet (5.18 meters);
xx. The port bosses are connected respectfully to each a gas connecting pipe and a liquids connecting pipe;
xxi. The gas connecting pipe terminates at an isolation valve;
xxii. The gas connecting pipe is also connected to a pressure relief valve before the isolation valve;
xxiii. The liquids connecting pipe terminates at an isolation valve;
xxiv. A dip tube is securely connected and sealed to the inside of the port boss associated with the liquids connecting pipes with an end that is adjacent to the inner side wall of the said type 4 pressure vessel;
xxv. One or more gas isolation valves are interconnected by a gas manifold connection pipe;
xxvi. At least one quick-connect loading and discharge nozzle is respectfully connected to both the gas manifold connection isolation valve and the liquids manifold connection isolation valve;
xxvii. One or more isolation valves are installed between successive said quick-connect nozzles before the gas manifold connection isolation valve and the liquid manifold connection isolation valve such that loading and/or offloading of gaseous fluids is possible through either or both said gas manifold connection pipe or the liquids manifold connection pipe;
xxviii. The connections of piping may be made by means of retaining ring flanges or crimping;
xxix. The liquid connecting pipes and the gas connecting pipes are chilled or heated through direct contact with cooling and or heating lines respectively;
xxx. The intermodal container or road trailer is equipped with refrigeration equipment;
xxxi. The intermodal container or road trailer is supplied with cooling/heating lines adapted for connection to an external refrigeration/heating system;
xxxii. The intermodal container or road trailer has thin non-stick material installed on inside of container walls both before and after installation of said insulation material;
xxxiii. The type 4 pressure vessels are encased in rigid foam insulation;
xxxiv. The means for monitoring or inspection comprises fiber-optic cable wrapped integrally onto the outside said type 4 pressure vessels;
xxxv. The intermodal container or road trailer is used as a storage and or transport container for the gaseous fluids with additional low-temperature resistant metallic members installed alongside inner edges of said container to increase the structural integrity of the said container;
xxxvi. The metallic members are used to secure and aid in the installation of the frames containing said type 4 pressure vessels inside of the intermodal container or road trailer;
xxxvii. The intermodal containers are installed and interconnected on a floating vessel to convert the vessel into a gaseous fluids transport vessel;
xxxviii. The gaseous fluid of said gaseous fluids may be unprocessed or slightly processed wellbore fluids.

The invention claimed is:
1. A lightweight intermodal container or road trailer based system for transporting refrigerated gaseous fluids, comprising:
an enclosed and insulated transportation housing;
a plurality of low-temperature resistant pressure vessels at least three feet in diameter secured within said transportation housing for containing said gaseous fluids, each of said pressure vessels including a body portion and opposing domed end portions attached to said body portion, each of said domed end portions having a wall thickness that is greater than a wall thickness of said body portion and an opening; and
at least one port boss affixed to each of said domed end portions, said at least one port boss including an inner component and an outer component, said inner component including an inner pipe and an inner plate transversely extending from said inner pipe, and said outer component including an outer pipe and an outer plate transversely extending from said outer pipe, wherein said inner pipe is inserted through said opening in each of said domed end portions and through said outer pipe such that said inner component and said outer component are compressed together to cause said inner plate to engage an inner surface of a respective one of said domed end portions and said outer plate to engage an outer surface of said respective one of said domed end portions to affix said at least one port boss to each of said domed end portions.

2. The system as set forth in claim 1, wherein said low-temperature resistant pressure vessels, comprise:
   a polymeric blow-molded or rotomolded liner made from at least two liner parts;
   low-temperature resistant metallic polar port bosses on said liner; and,
   a fiber reinforced plastic shell made from filament winding of continuous strands of fibrous material in a thermoplastic matrix onto said polymeric liner.

3. The system as set forth in claim 2, wherein said fibrous material is selected from the group consisting of fiberglass, basaltic fiber, carbon fiber or combinations thereof.

4. The system as set forth in claim 2, wherein two or more of said liner parts with permanently affixed port bosses at polar ends are fusion welded together to form a complete liner.

5. The system as set forth in claim 2, wherein said port bosses are affixed to the apex of a dome segment of said liner parts by compression and crimping.

6. The system as set forth in claim 2, wherein said polymeric blow-molded liner comprises high density polyethylene (HDPE).

7. The system as set forth in claim 2, wherein the fusion welded liner parts form a sphere or a cylinder.

8. The system as set forth in claim 2, wherein the wall thickness of the body portion of said liner is thinnest.

9. The system as set forth in claim 2, wherein said pressure vessels are supported at the port boss within a metallic or nonmetallic rectangular frame in a vertical or horizontal orientation.

10. The system as set forth in claim 1, wherein said gaseous fluids are selected from the group consisting of natural gas or components thereof, hydrogen, nitrogen, carbon dioxide, wellbore contents, air and combinations thereof.

11. The system as set forth in claim 1, wherein a low-temperature resistant metallic or non-metallic composite frame of rectangular shape supports at least one pressure vessel and is dimensioned to fit through end doors of said transportation housing.

12. The system as set forth in claim 1, further including insulation material affixed to an inside surface of the intermodal container or the road trailer.

13. The system as set forth in claim 1, wherein said pressure vessels are wrapped with a non-stick film-type material such as polyethylene or polypropylene.

14. The system as set forth in claim 1, wherein said natural gas or other gaseous fluid is chilled and compressed such that the density exceeds 300 kg/m$^3$.

15. The system as set forth in claim 1, wherein chilled and compressed gaseous fluid is pumped for loading and/or off-loading.

* * * * *